(12) United States Patent
Kaneko

(10) Patent No.: US 10,988,051 B2
(45) Date of Patent: Apr. 27, 2021

(54) SEAT SUPPORT MECHANISM

(71) Applicant: KOITO ELECTRIC INDUSTRIES, LTD., Shizuoka (JP)

(72) Inventor: Fumito Kaneko, Shizuoka (JP)

(73) Assignee: KOITO ELECTRIC INDUSTRIES, LTD., Sizuoka (JP)

( * ) Notice: Subject to any disclaimer, the term of this patent is extended or adjusted under 35 U.S.C. 154(b) by 0 days.

(21) Appl. No.: 16/320,562

(22) PCT Filed: Jan. 24, 2017

(86) PCT No.: PCT/JP2017/002298
§ 371 (c)(1),
(2) Date: Jan. 25, 2019

(87) PCT Pub. No.: WO2018/020706
PCT Pub. Date: Feb. 1, 2018

(65) Prior Publication Data
US 2019/0241097 A1    Aug. 8, 2019

(30) Foreign Application Priority Data

Jul. 28, 2016  (JP) .............................. JP2016-148757

(51) Int. Cl.
*B60N 2/07* (2006.01)
*A47C 3/18* (2006.01)
(Continued)

(52) U.S. Cl.
CPC .................. *B60N 2/07* (2013.01); *A47C 3/18* (2013.01); *B60N 2/06* (2013.01); *B60N 2/08* (2013.01);
(Continued)

(58) Field of Classification Search
CPC ... B60N 2/07; B60N 2/06; B60N 2/08; B60N 2/0806; B60N 2/14; B60N 2/143;
(Continued)

(56) References Cited

U.S. PATENT DOCUMENTS 2,095,561 A * 10/1937 Bell .................... B61D 33/0085
248/395
2,123,927 A * 7/1938 Bell .................... B61D 33/0085
248/416
(Continued)

FOREIGN PATENT DOCUMENTS

JP        1983/126533      *  8/1983   ............... E05D 7/12
JP        H06-262971 A       9/1994
(Continued)

OTHER PUBLICATIONS

Machine Translation of Mutou JP H06-262971 (Year: 1994).*
International Search Report for PCT/JP2017/002298 issued by ISA/JP dated Apr. 18, 2017.

*Primary Examiner* — Christopher Garft
(74) *Attorney, Agent, or Firm* — Kubotera & Associates, LLC

(57) ABSTRACT

A seat support mechanism including a leg pedestal (11), which is fixedly provided on a floor in the vicinity of a side wall (A), a moving pedestal (20), which is disposed under a top face part (12) of the leg pedestal (11) and is capable of being advanced/retracted in a direction orthogonal to the side wall A; an underframe (30) of the seat, which is disposed above the top face part (12) of the leg pedestal (11), and is turnably supported by a turning shaft (41) in the moving pedestal (20), the turning shaft (41) avoiding an interference with the top face part (12), and an interlocking mechanism (50), which interlocks turning and advancing/retracting of the underframe (30), in which, when the seat is turned together with the underframe (30), the interlocking
(Continued)

mechanism (50) converts the turning motion of the underframe (30) into a linear motion and, through the turning shaft (41), transmits it to the moving pedestal (20), thereby causing the moving pedestal (20) and the underframe (30) to be advanced/retracted in a direction orthogonal to the side wall (A).

5 Claims, 20 Drawing Sheets

(51) Int. Cl.
    *B60N 2/14*     (2006.01)
    *B60N 2/06*     (2006.01)
    *B60N 2/08*     (2006.01)
    *B61D 33/00*     (2006.01)

(52) U.S. Cl.
    CPC ............. *B60N 2/0806* (2013.01); *B60N 2/14* (2013.01); *B61D 33/00* (2013.01); *B61D 33/0014* (2013.01); *B61D 33/0085* (2013.01)

(58) Field of Classification Search
    CPC ........ B60N 2/146; B60N 2/10; B60N 2/2869; B60N 2/3052; B60N 2/3061; B60N 2/3018; B60N 2002/022; A47C 3/18; B61D 33/00; B61D 33/0014; B61D 33/0085
    USPC .......................................................... 248/429
    See application file for complete search history.

(56) References Cited

U.S. PATENT DOCUMENTS

| | | | | |
|---|---|---|---|---|
| 2,204,218 | A * | 6/1940 | Hill .................... | B62D 33/0633 248/395 |
| 4,844,543 | A * | 7/1989 | Ochiai .................... | A47C 3/18 297/344.26 |
| 6,302,483 | B1 * | 10/2001 | Ricaud ............... | B61D 33/0085 297/344.22 |
| 6,332,648 | B1 * | 12/2001 | Aucheron .......... | B61D 33/0085 248/416 |
| 6,557,919 | B2 * | 5/2003 | Suga ........................ | B60N 2/14 296/65.07 |
| 2005/0179302 | A1 * | 8/2005 | Chung ..................... | A47C 3/18 297/423.27 |
| 2009/0127908 | A1 * | 5/2009 | Kucharski ................ | B60N 2/14 297/344.24 |
| 2012/0256459 | A1 * | 10/2012 | Nilsson .................. | A47C 1/023 297/344.21 |
| 2014/0138997 | A1 * | 5/2014 | Schulz ..................... | B60N 2/07 297/344.24 |
| 2016/0374879 | A1 * | 12/2016 | Christian ............... | A61G 5/125 297/313 |

FOREIGN PATENT DOCUMENTS

| | | |
|---|---|---|
| JP | H06-286506 A | 10/1994 |
| JP | H10-16773 A | 1/1998 |
| JP | 3431772 B2 | 5/2003 |

* cited by examiner

SEAT SUPPORT MECHANISM

TECHNICAL FIELD

The present invention relates to a seat support mechanism for turning a seat to change over the directed state thereof, being applied to seats that are equipped in various vehicles, such as railroad vehicles, automobiles, airplanes, and marine vessels.

BACKGROUND ART

Conventionally, many of the seats that are equipped in vehicles, such as railroad vehicles, are of bench type, and this type of seat extends longer in a direction of from one side thereof to the other, being able to accommodate a plurality of persons, and generally installed along the wall face of a vehicular side wall. As such a seat, the rotary seat is known which can be turned around the turning shaft at the center of the seat to change over the directed state thereof from a longitudinally directed state, in which the seat back face side is in parallel with the wall face, to a crosswise directed state, in which the seat back face side is orthogonal to the wall face, or vice versa.

With such a rotary seat, the turning shaft is generally fixed in a single place, and it is required that the seat be installed away from the side wall such that, when the seat is turned, the locus drawn by a corner of the seat (i.e., the turning trajectory circle of the seat) will not be interfered with the side wall. Consequently, there has been presented a problem that a gap is required to be provided between the seat and the side wall, or the seat is needed to be installed, being protruded toward the aisle in the vehicle, thereby the width of the aisle or the seat being narrowed down, resulting in the limited space in the vehicle being not be able to be effectively utilized.

Then, in order to solve the above-mentioned problem, the patent literature 1 proposes a seat changing-over mechanism with which, when the directed state of a seat is to be changed over from a longitudinally directed state to a crosswise directed state, or vice versa, a second movable frame of a seat is slid forward with respect to a first movable frame of the same in order to secure a sufficient turning radius of the seat. With such seat directed-state changing-over mechanism, the seat is once slid to be protruded toward the aisle, and after a sufficient turning radius having been secured, the seat is turned through 90 deg., and then again slid toward the side wall to restore the original position of the second movable frame relative to the first movable frame.

Further, the patent literature 2 proposes a seat disposition-state changing-over device that is provided with a transmission mechanism in addition to the respective mechanisms for seat turning and sliding, and that, in changing over the directed state of a seat, interlocks turning of a seat with sliding of the same by means of the transmission mechanism. With such seat disposition-state changing-over device, a sliding frame is slidably supported on a fixed frame, the seat being turnably mounted on the sliding frame, and through the engagement of one component with another, turning of a seat is interlocked with sliding of the same.

CITATION LIST

Patent Literature

Patent Document 1: Japanese Unexamined Utility Model Application Publication No. Hei 6-32164
Patent Document 2: Japanese Patent No. 3431772

SUMMARY OF THE INVENTION

However, the technology disclosed in the patent literature 1 has presented a practical problem that, in order to change over the directed state of a seat, it is required to perform three different operations of forward sliding, turning, and return sliding separately, which is extremely complicated and troublesome, thereby the change-over time being increased. In addition, there has been presented a design problem that, the number of parts of the respective mechanisms for implementing the three different operations is large, making the configuration intricate, resulting in the costs being increased, with the disposition of parts in a limited space around the legs of the seat being made difficult, and thus mounting of another component, such as a heater, being restricted.

With the technology disclosed in the patent literature 2, the directed state of a seat can be changed over by using the transmission mechanism to interlock turning of the seat with sliding of the same. However, with the structure in which the fixed frame, the sliding frame, and the seat are laid one over another in this order from the bottom, it is difficult to directly lock the seat with the fixed frame, and thus for restraining the seat from being turned, it is required to utilize the sliding frame, which is interposed between the seat and the fixed frame. Further, in order to restrain the seat so as not to be able to be slid, it is required to separately lock the sliding frame with the fixed frame, and thus there has been presented a problem of deficiency in degree of design freedom particularly for locking.

The present invention has been made in view of the above-mentioned problems that are associated with the prior arts, and is intended to provide a seat support mechanism with which turning of a seat is interlocked with advancing/retracting of the same; the directed state of a seat can be easily changed over through a series of operations based on a simple structure alone; and yet it is possible to make a design allowing turning and advancing/retracting of a seat to be restrained simultaneously.

The subject matter of the present invention to achieve the above purpose is disclosed in the inventions as stated in the following respective items [1] to [8]:

[1] A seat support mechanism for turning a seat to change over the directed state thereof, including:

a leg pedestal, which is fixedly provided on a floor in the vicinity of a wall face, a moving pedestal, which is disposed under a top face part of the leg pedestal and is capable of being advanced/retracted in a direction orthogonal to the wall face;

an underframe of the seat, which is disposed above the top face part of the leg pedestal, and is turnably supported by a turning shaft in the moving pedestal, the turning shaft avoiding an interference with the top face part, and an interlocking mechanism, which, when the seat is turned together with the underframe, converts a turning motion of the underframe into a linear motion, and transmits it to the moving pedestal through the turning shaft, thereby advancing/retracting the moving pedestal together with the underframe in a direction orthogonal to the wall face, the directed state of the seat being capable of being changed over by the interlocking mechanism from a longitudinally directed state, in which the seat back face side is in parallelism to the wall face, to a crosswise directed state, in which the seat back face side is orthogonal to the wall face.

[2] The seat support mechanism according to [1], wherein, in the top face part of the leg pedestal, there is provided an avoidance part, through which the turning shaft, which is moved with the advancing/retracting of the moving pedestal, is capable of being passed along the movement locus thereof.

[3] The seat support mechanism according to [1] or [2], wherein the interlocking mechanism includes:

a guide rail, which is provided above the top face part of the leg pedestal, and a roller, which is provided under the underframe, being moved while being turned with the turning of the underframe, while being pressed against the guide rail.

[4] The seat support mechanism according to [3], wherein the roller includes an auxiliary roller, the auxiliary roller being supported so as to be able to be brought close to or away from the roller, being urged in a direction of being brought close thereto, and the roller and the auxiliary roller sandwiching the guide rail from both sides when the directed state of the seat is changed over to the longitudinally directed state or the crosswise directed state.

[5] The seat support mechanism according to any one of [1] to [4], including a turning locking mechanism, which is capable of restraining the underframe from being turned and advanced/retracted simultaneously.

[6] The seat support mechanism according to [5], wherein the turning locking mechanism (60) includes:

a locking hole, which is provided on one longer side along the seat back face side and on both shorter sides along both sides of the seat, respectively, in the underframe, being in the shape of a rectangle, which is long in a direction of from one side to the other, and a locking pin, which is provided in the top face part of the leg pedestal so as to be able to be protruded upward or retracted downward, and when the directed state of the seat has been changed over to the longitudinally directed state or the crosswise directed state, is protruded into and engaged to the locking hole to which it has been aligned in a vertical direction in the relevant changed-over position.

[7] The seat support mechanism according to any one of [1] to [6], including an advance/retraction locking mechanism, being capable of restraining the underframe from being advanced/retracted.

[8] The seat support mechanism according to [7], wherein the advance/retraction locking mechanism includes:

a locking hole, which is provided in locations separated from one another on the front and rear sides of the moving pedestal, respectively, and a locking pin, which is provided so as to be able to be protruded upward or retracted downward in the inner part of the leg pedestal, and when the directed state of the seat has been changed over to the longitudinally directed state or the crosswise directed state, is protruded into and engaged to the locking hole to which it has been aligned in a vertical direction in the relevant changed-over position of the seat.

Next, the functions based on the aspects of the inventions that are stated in the above items [1] to [8] will be explained.

According to the seat support mechanism (10), which is stated in the above item [1], under the top face part (12) of the leg pedestal (11), which is fixedly provided on the floor, the moving pedestal (20), which is capable of being advanced/retracted in a direction orthogonal to the wall face, is disposed, while, above the top face part (12), the underframe (30), being supported by the turning shaft (41), which is provided in the moving pedestal (20), is disposed.

Therefore, the seat support mechanism (10) provides a structure in which the leg pedestal (11), the moving pedestal (20), the top face part (12) of the leg pedestal (11), and the underframe (30) are laid one over another from the bottom in this order. Therefore, it is required that the top face part (12), which is interposed between the moving pedestal (20) and the underframe (30), do not hinder the motion of the turning shaft (41) at the time of advancing/retracting of the moving pedestal (20). In response to such requirement, the top face part (12) is provided with an avoidance part (12a), whereby the turning shaft (41) can be moved while avoiding any interference with the top face part (12), and thus advancing/retracting of the moving pedestal (20) under the top face part (12) of the leg pedestal (11) can be implemented.

More specifically, as stated in the above item [2], in the top face part (12) of the leg pedestal (11), there may be provided an avoidance part (12a), through which the turning shaft (41), which is moved with the advancing/retracting of the moving pedestal (20), is capable of being passed along the movement locus thereof. Herein, the avoidance part (12a) will answer the purpose so long as the top face part (12) is not interfered with the turning shaft (41) in a place along the movement locus of the turning shaft (41). Therefore, the avoidance part (12a) may be formed as a cutout that is recessed toward the inside from one end edge of the top face part (12) or as a long narrow hole or groove so as to include the movement locus of the turning shaft (41).

The seat support mechanism (10) is provided with the interlocking mechanism (50), and when the seat is turned together with the underframe (30), the turning motion of the underframe (30) is converted into a linear motion and, through the turning shaft (41), is transmitted to the moving pedestal (20). Therefore, the moving pedestal (20) is advanced/retracted in a direction orthogonal to the wall face together with the underframe (30), which is being turned. With such an interlocking operation between turning and advancing/retracting of the seat, the directed state of the seat can be easily changed over between the longitudinally directed state, in which the seat back face side is in parallelism with the wall face and the crosswise directed state, in which the seat back face side is orthogonal to the wall face, through a series of operations with no interference of the seat with the wall face being caused, even if the seat is in the vicinity of the wall face.

As stated in the above item [3], the interlocking mechanism (50) includes, for example, a guide rail (51), which is provided above the top face part (12) of the leg pedestal (11), and a roller (52), which is provided under the underframe (30), being moved while being turned with the turning of the underframe (30), while being pressed against the guide rail (51).

In this way, when the seat is turned together with the underframe (30), the roller (52) is moved while being turned along the guide rail (51). At this time, the underframe (30), in which the roller (52) is provided, is relatively pushed by the guide rail (51), which provides the fixed side, and thus the moving pedestal (20), which supports the underframe (30) with the turning shaft (41) is advanced/retracted in a direction orthogonal to the wall face. In this way, the possibility that the seat may be interfered with the wall face can be eliminated.

As stated particularly in the above item [4], in the case where the roller (52) includes an auxiliary roller (53), and the auxiliary roller (53) is supported so as to be able to be brought close to or away from the roller (52), being urged in a direction of being brought close thereto, the roller (52) and the auxiliary roller (53) sandwich the guide rail (51) from both sides when the directed state of the seat is changed over to the longitudinally directed state or the crosswise directed state. In this way, the roller (52) can be reliably moved along the guide rail (51).

In addition, after the directed state of the seat having been changed over to either the longitudinally directed state or the crosswise directed state, it is required to restrain the underframe (30) so as not to be able to be turned such that the seat is not turned accidentally. Conventionally, in order to restrain the underframe (30) so as not to be able to be turned, it is locked from the moving pedestal (20), which supports the underframe (30) with the turning shaft (41). On the contrary to this, according to the present seat support mechanism (10), the underframe (30) is disposed above the top face part (12) of the leg pedestal (11), which provides the base fixed side, and is turned without the moving pedestal (20) being interposed between it and the top face part (12). Therefore, the underframe (30) can be locked directly from the leg pedestal (11) to be restrained from being moved.

Herein, in the case where the underframe (30) is locked from the leg pedestal (11) side to be restrained from being moved, the underframe (30) is made unable not only to be turned, but also to be advanced/retracted with respect to the leg pedestal (11). Then, as stated in the above item [5], it is possible to easily implement the turning locking mechanism (60) that can restrain the underframe (30) from being turned and advanced/retracted simultaneously. With such turning locking mechanism (60), not only restraining the underframe (30) from being turned with respect to the moving pedestal (20), but also restraining the moving pedestal (20) with respect to the leg pedestal (11) can be performed by means of a single locking mechanism.

As stated in the above item [6], the turning locking mechanism (60) may be provided with, as a portion to be locked on the underframe (30) side, a locking hole (62), which is provided on one longer side along the seat back face side and on both shorter sides along both sides of the seat, respectively, in the underframe (30), being in the shape of a rectangle, and as a locking element on the leg pedestal (11) side, a locking pin (61), which is provided in the top face part (12) of the leg pedestal (11) so as to be able to be protruded upward or retracted downward. If, when the directed state of the seat has been changed over to either the longitudinally directed state or the crosswise directed state, the locking pin (61) is protruded into and engaged to the locking hole (62) to which it has been aligned in a vertical direction in the relevant changed-over position of the seat, the seat can be restrained in the relevant changed-over position thereof with a simple structure.

In addition, in order to enhance the force of restraining the seat, as stated in the above item [6], an advance/retraction locking mechanism (70), being capable of restraining the underframe (30) from being advanced/retracted, may be provided besides the turning locking mechanism (60). In this way, it has been made possible to restrain advancing/retracting of the seat even in the state in which the restraint by the turning locking mechanism (60) has been released, whereby the seat can be turned with the advanced/retracted position of the seat remaining fixed.

As stated in the above item [8], the advance/retraction locking mechanism (70) may be provided with, for example, a locking hole (72), which is provided in locations separated from one another on the front and rear sides of the moving pedestal (20), respectively, as a portion to be locked, and a locking pin (71), which is provided so as to be able to be protruded upward or retracted downward in the inner part of the leg pedestal (11). If, when the directed state of the seat has been changed over to the longitudinally directed state or the crosswise directed state, the locking pin (71) is protruded to be inserted into and engaged to the locking hole (72) to which it has been aligned in a vertical direction in the relevant advanced/retracted position of the seat.

With the seat support mechanism according to the present invention, turning and advancing/retracting of the seat can be interlocked to change over the directed state of the seat by making a series of operations based on a simple structure alone; operability is good; and it is possible to implement cost reduction and weight lighting of the entire seat. Further, it is made possible to make a design that allows restraining of the seat from being turned and advanced/retracted simultaneously, and the degree of design freedom for locking is increased, whereby, in a limited space around the legs of the seat, another component can be easily disposed.

DETAILED DESCRIPTION OF THE PREFERRED EMBODIMENTS

Hereinbelow, an embodiment representing the present invention will be explained with reference to the drawings.

FIG. 1 to FIG. 26 show one embodiment of the present invention.

A seat support mechanism 10 according to an embodiment of the present invention is for turning a seat to change over the directed state thereof. Herein, the application for the seat is not particularly limited, however, hereinbelow, the case where the present invention is applied to a bench for two occupants that is to be equipped in a cabin of a railroad vehicle will be explained as an example. The symbol "A" in FIG. 1 denotes a part of a wall face in the vehicle cabin. Herein, the wall face refers to an internal wall face of a side wall provided in parallel with the direction of travel of the vehicle, and hereinbelow it will be referred to as the side wall A.

Figure 1:
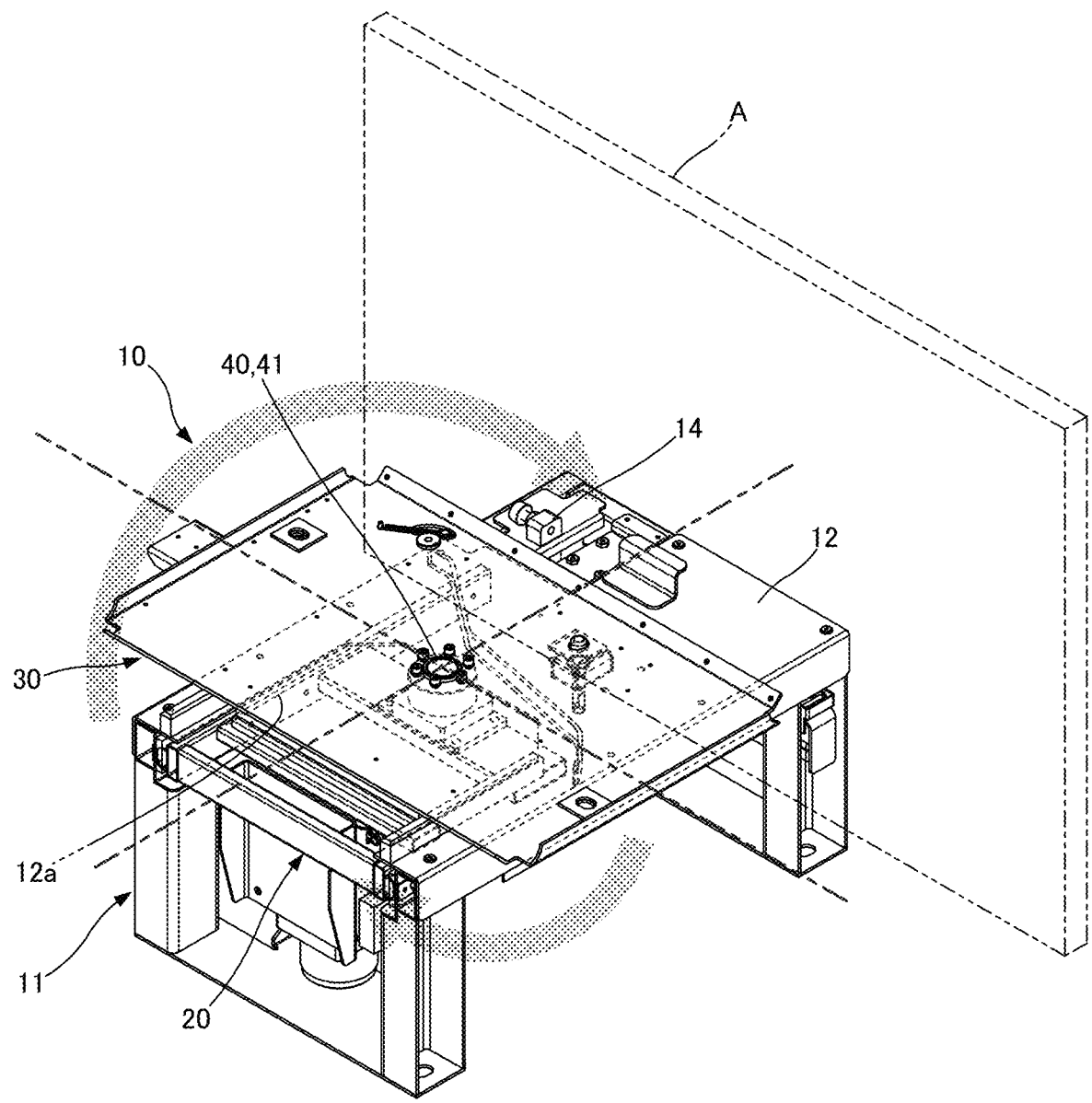
FIG. 1 is a perspective view showing a seat support mechanism according to an embodiment of the present invention, illustrating an operation for changing over the directed state of a seat (not shown) from a longitudinally directed state to a crosswise directed state.

As shown in FIG. 1, the seat support mechanism 10 includes a leg pedestal 11, a moving pedestal 20, and an underframe 30 of the seat. With the seat support mechanism 10, the directed state of the seat can be changed over between a longitudinally directed state, in which the seat back face side is in parallelism with the side wall A (the wall face), and a crosswise directed state, in which the seat back face side is orthogonal to the side wall A. Herein, if it is assumed that the angle of the seat in the longitudinally directed state is 0 deg., the term of the crosswise directed state collectively refers to one crosswise directed state (a 90-deg. turned state), which is given by turning the seat from the longitudinally directed state through 90 deg. in one direction, or an opposite crosswise directed state (a 270-deg. turned state), which is obtained by further turning the seat through 180 deg. in the same one direction.

Figure 2:
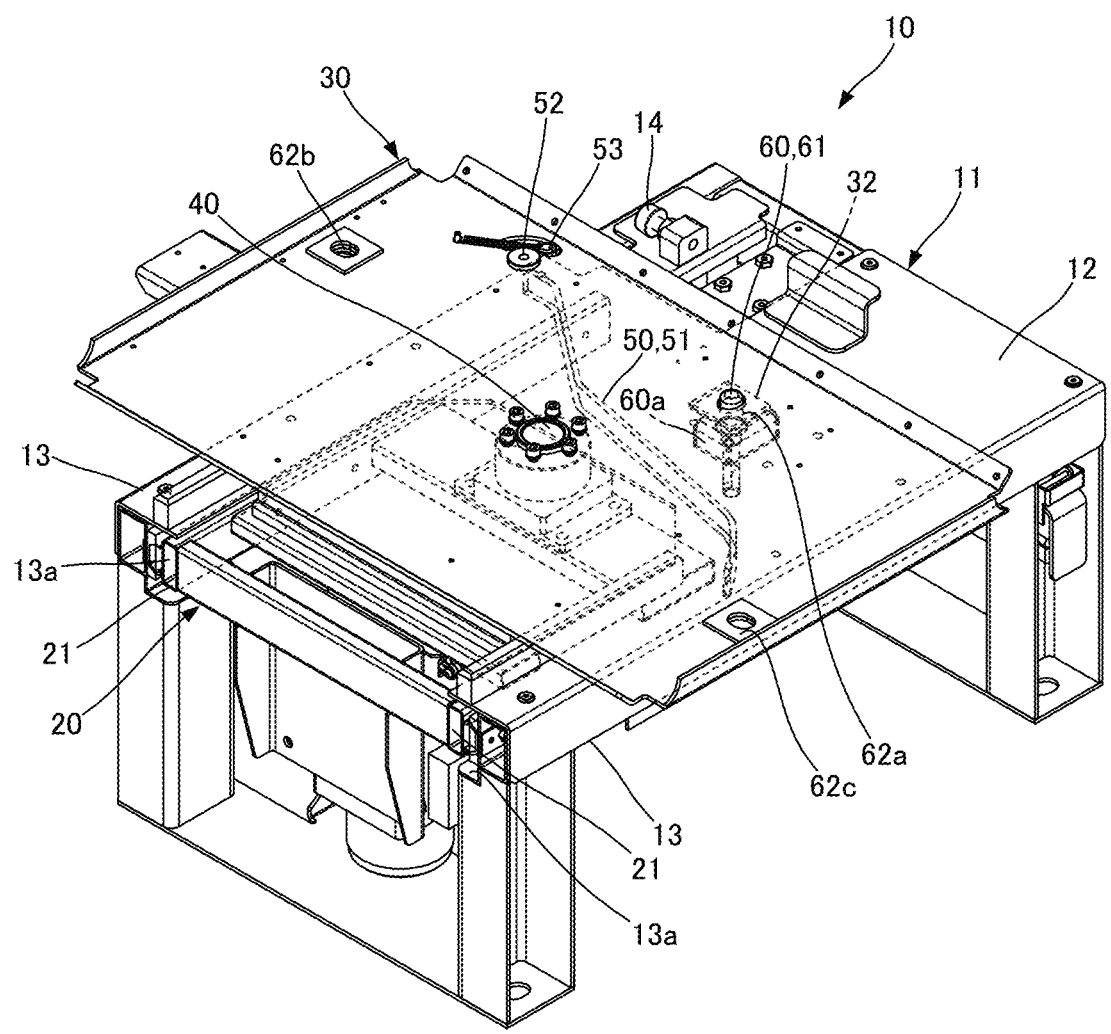
FIG. 2 is a perspective view showing a seat support mechanism according to an embodiment of the present invention, the directed state of the seat (not shown) that has been provided by the seat support mechanism being a longitudinally directed state.
Figure 3:
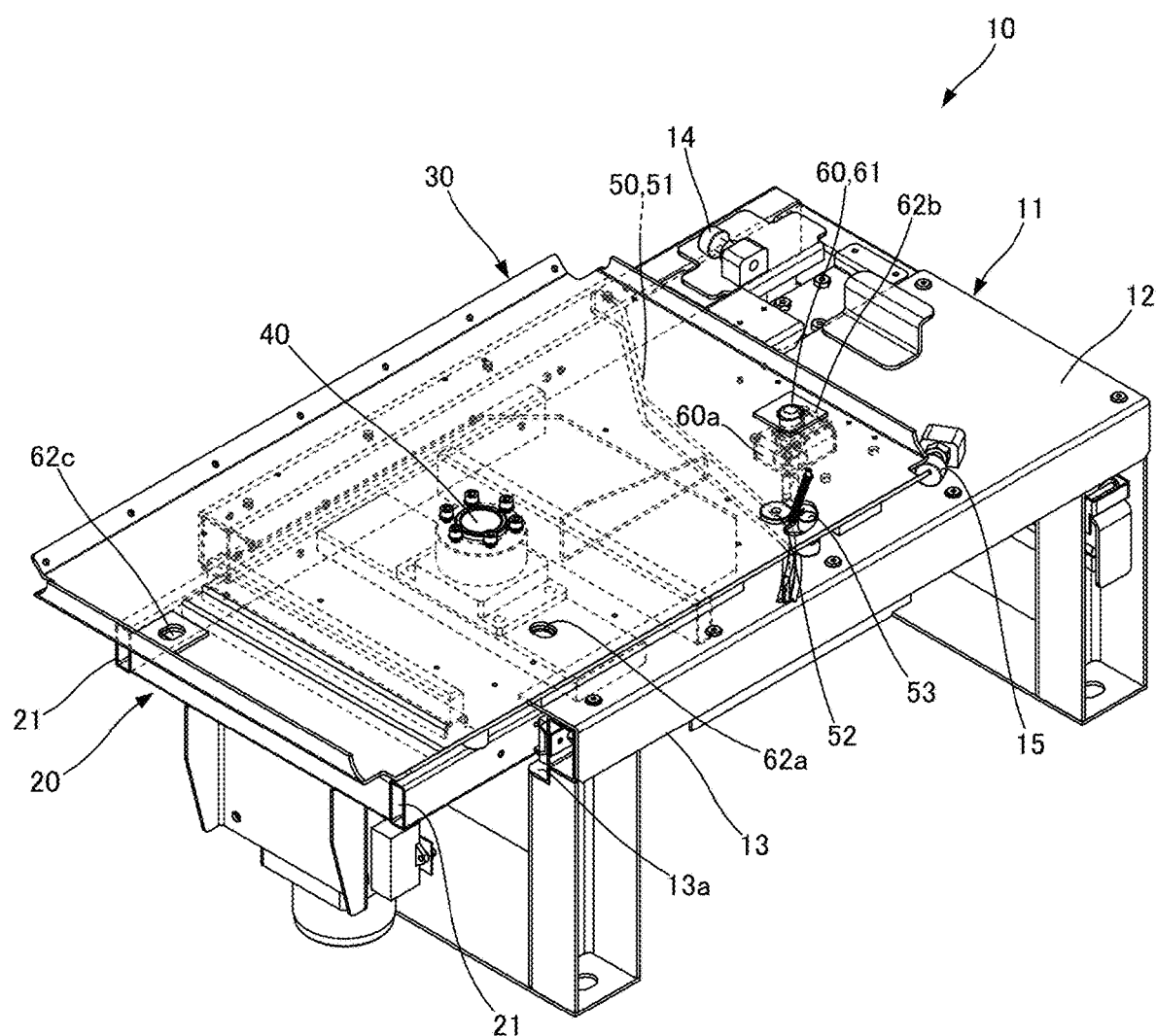
FIG. 3 is a perspective view showing a seat support mechanism according to an embodiment of the present invention, the directed state of the seat (not shown) that has been provided by the seat support mechanism being one crosswise directed state.

FIG. 2 shows the longitudinally directed state of the seat; FIG. 3 the one crosswise directed state of the seat; and FIG. 4 the opposite crosswise directed state of the seat. Hereinbelow, in case where the one crosswise directed state and the opposite crosswise directed state are to be collectively referred to, they are simply referred to as the crosswise directed state. The seat (not shown) is that for two occupants, having two seat parts and backrests, which are provided in juxtaposition in a direction of from one side of the seat to the other. A plurality of such seats are generally disposed on the floor of a vehicle cabin by two rows on the right and left sides of the passage and at prescribed intervals along a direction of travel.

Figure 5:
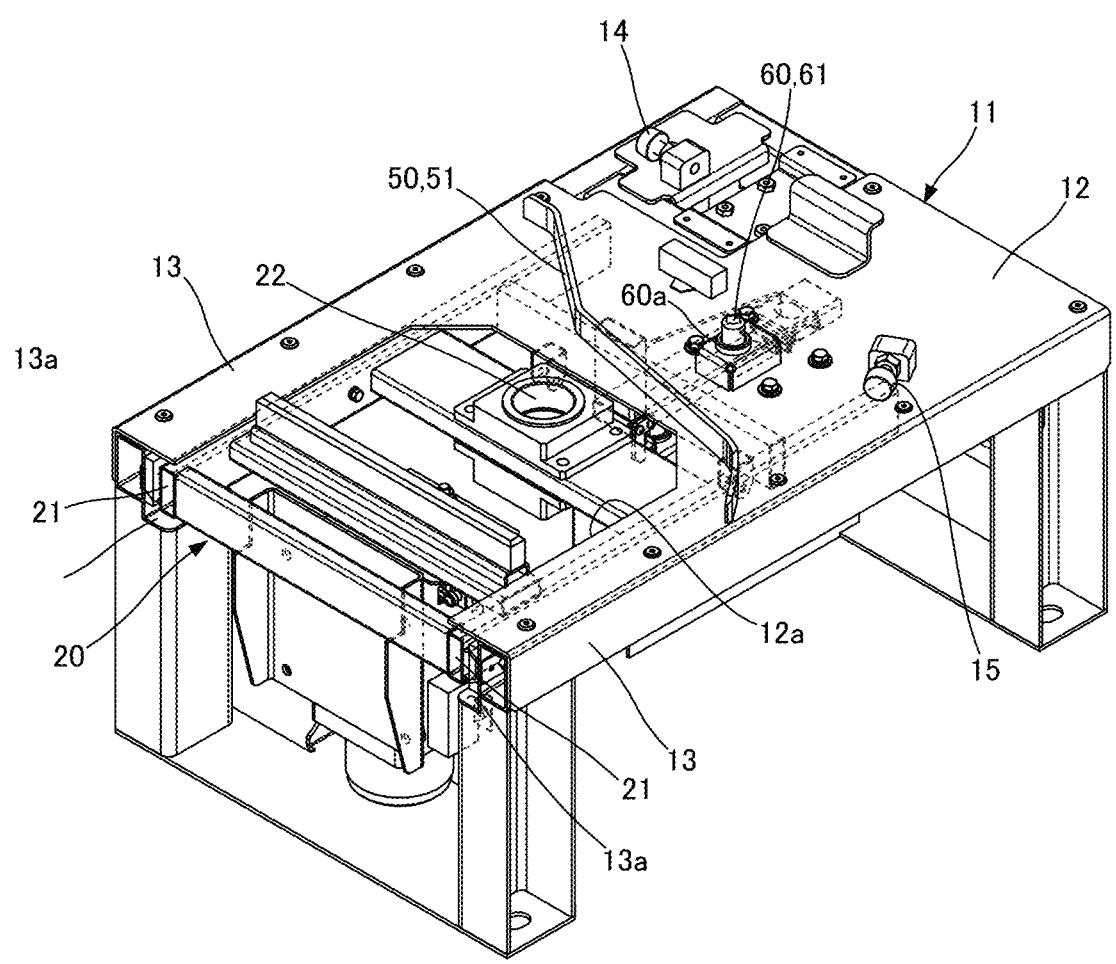
FIG. 5 is a perspective view showing a seat support mechanism (with the underframe being removed for simplicity of illustration) according to an embodiment of the present invention, the directed state that has been provided by the seat support mechanism being a longitudinally directed state.
Figure 6:
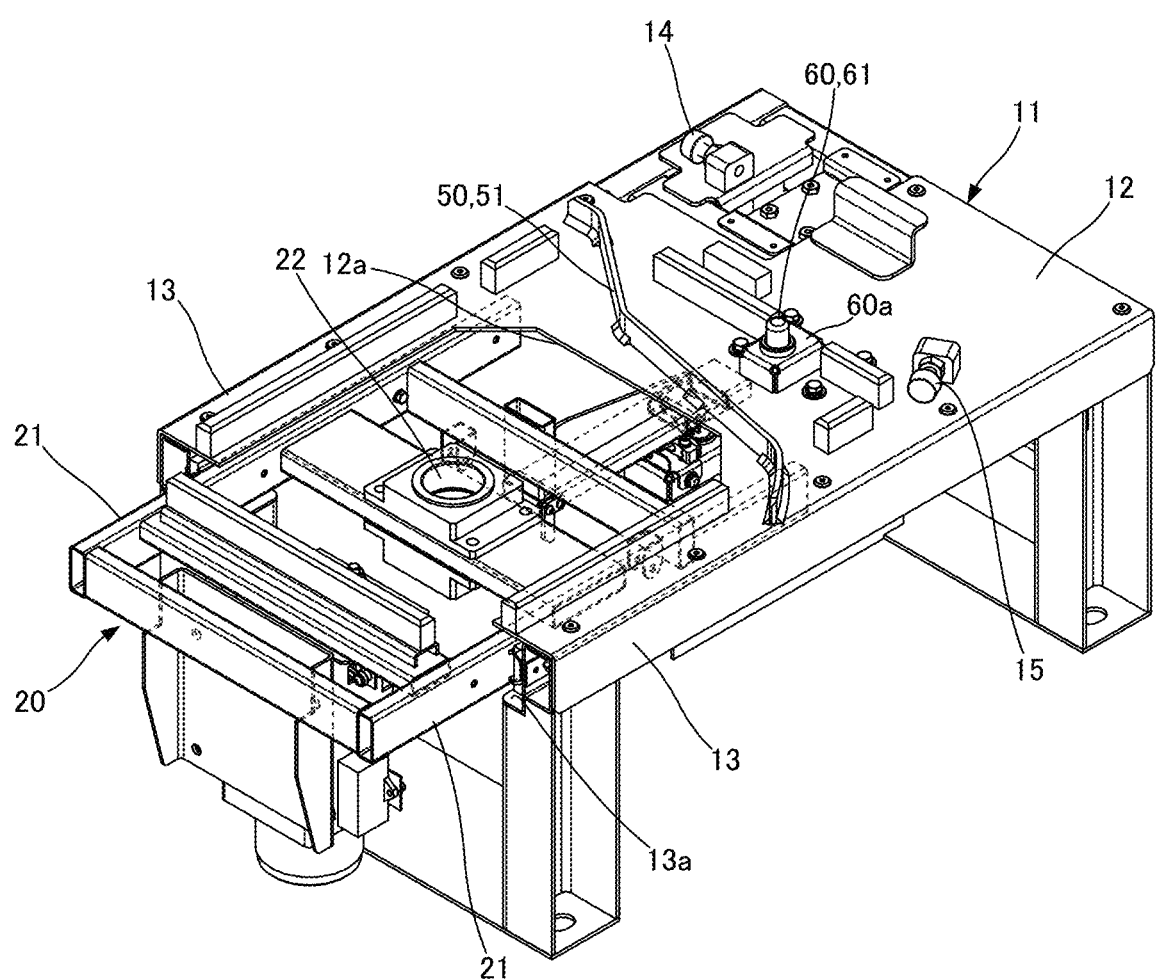
FIG. 6 is a perspective view showing a seat support mechanism (with the underframe being removed for simplicity of illustration) according to an embodiment of the present invention, the directed state of the seat (not shown) that has been provided by the seat support mechanism being a crosswise directed state.

FIG. 5 shows the longitudinally directed state of the seat (not shown) in the seat support mechanism 10 excluding the underframe 30 therefrom, while FIG. 6 the crosswise directed state of the seat in the seat support mechanism 10 excluding the underframe 30 therefrom. As shown in FIG. 5 and FIG. 6, the leg pedestal 11 is fixedly provided on the floor in the vicinity of the side wall A in the vehicle cabin (see FIG. 1). The leg pedestal 11 is configured by combining frame members in the form of a long pedestal in a direction substantially orthogonal to the side wall A.

A top face part 12, which covers the top of the leg pedestal 11, is substantially horizontal, the longer sides on both sides of the top face part 12, which extend in a longitudinal direction, being substantially orthogonal to the side wall A, while the shorter sides on the front and back sides of the top face part 12 being substantially parallel to the side wall A. In the top face part 12, there is provided an avoidance part 12a, through which a later described turning shaft 41, which is moved with the advancing/retracting of the later-described moving pedestal 20, can be passed along the movement locus thereof. The avoidance part 12a is provided as a cutout that is opened at the shorter side on the front side of the top face part 12 and recessed toward the inside, being extended substantially to the center of the top face part 12. The avoidance part 12a serves as a portion for avoiding the turning shaft 41 from being interfered with the top face part 12. On the top face part 12, there are mounted such underframe-related parts as a stopper 14 for regulating the direction of turning the underframe 30.

Just under the top face part 12 of the leg pedestal 11, the moving pedestal 20 is mounted so as to be advanced/retracted in a direction orthogonal to the side wall A through a sliding mechanism. The sliding mechanism includes a pair of guide rails 13a, 13a, which are provided inside of both side parts 13, 13 of the leg pedestal 11. The pair of guide rails 13a, 13a are opposed in parallel to each other along both longer sides of the top face part 12 of the leg pedestal 11, and to the inside of the respective guide rails 13a, 13a, both side parts 21, 21 of the moving pedestal 20, which will be described in the following paragraph, are fitted so as to be slid as they are.

The moving pedestal 20 is disposed under the top face part 12 of the leg pedestal 11, being configured by combining frame members in the form of a rectangular framework. Both side parts 21 of the moving pedestal 20 are slidably fitted to the inside of the above-mentioned guide rails 13a. Thus, the moving pedestal 20 is designed to be capable of being slid such that it is advanced or retracted in a direction substantially orthogonal to the side wall A.

Substantially at the center of the moving pedestal 20, there is provided a bearing part 22 of the turning mechanism 40, which serves as the center of turning of the seat (see FIG. 1). By the turning shaft 41 of the turning mechanism 40, which is mounted to the bearing part 22, the underframe 30 is turnably supported on the moving pedestal 20. Herein, the turning shaft 41 is extended upward from under the top face part 12 of the leg pedestal 11, however, by passing through the avoidance part 12a, it is not interfered with the top face part 12. To the upper end of the turning shaft 41, the underframe 30, which will be described in the following paragraph, is integrally mounted, thus the seat and the underframe 30 being turned together with the turning shaft 41.

Figure 4:
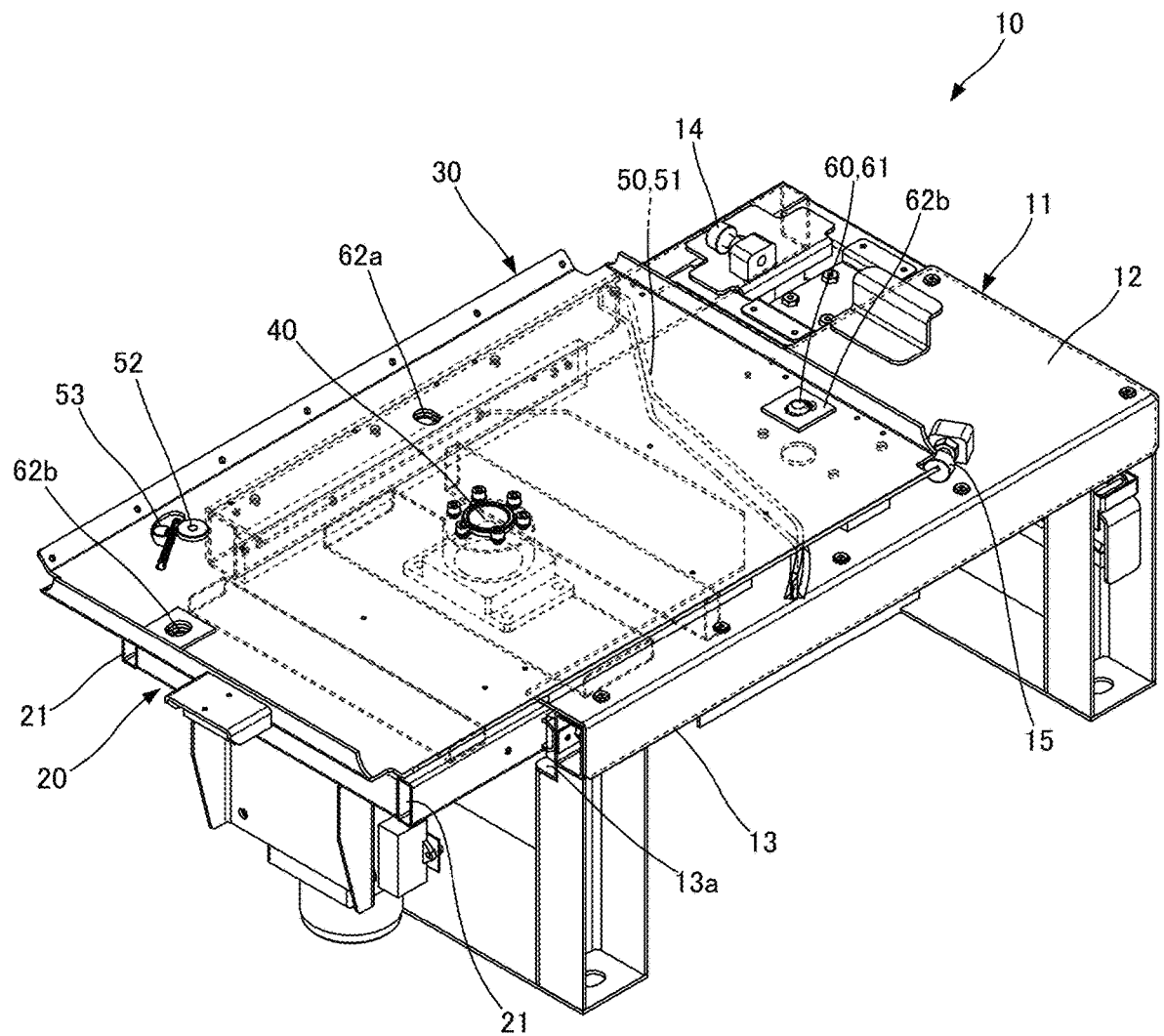
FIG. 4 is a perspective view showing a seat support mechanism according to an embodiment of the present invention, the directed state of the seat (not shown) that has been provided by the seat support mechanism being an opposite crosswise directed state.

As shown in FIG. 2 to FIG. 4, the underframe 30 is disposed above the top face part 12 of the leg pedestal 11, being constituted by a rectangular metallic plate. The underframe 30, to which the seat (not shown) is mounted to be supported thereby, is formed in the shape of a rectangle, being longer in a direction of from one side to the other so as to be matched to the seat part bottom face of the seat. The turning mechanism 40 is provided to turn the seat and the underframe 30 through an electric or manual operation to turn-drive the turning shaft 41, however, since the structure is general, a detailed explanation will be omitted Further, the seat support mechanism 10 includes an interlocking mechanism 50, with which, when the directed state of the seat is changed over to the longitudinally directed state or the crosswise directed state, turning and advancing/retracting of the seat are interlocked such that the seat will not be interfered with the side wall A. When the seat is turned together with the underframe 30, the interlocking mechanism 50 converts the turning motion of the underframe 30 into a linear motion and, through the turning shaft 41, transmits it to the moving pedestal 20, thereby causing the moving pedestal 20 and the underframe 30 to be advanced/retracted in a direction orthogonal to the side wall A such that they are brought closer to or away from the side wall A.

As shown in FIG. 2 and FIG. 3, the interlocking mechanism 50 includes a guide rail 51, which is provided above the top face part 12 of the leg pedestal 11, and a roller 52, which is provided under the underframe 30. In addition, the roller 52 has an auxiliary roller 53. The guide rail 51 is formed in a long shape, being passed beside the bearing part 22 and extended toward both sides while being bent, above the top face part 12 of the leg pedestal 11, and being protruded to a prescribed level from above the horizontal reference surface of the top face part 12.

Figure 15:
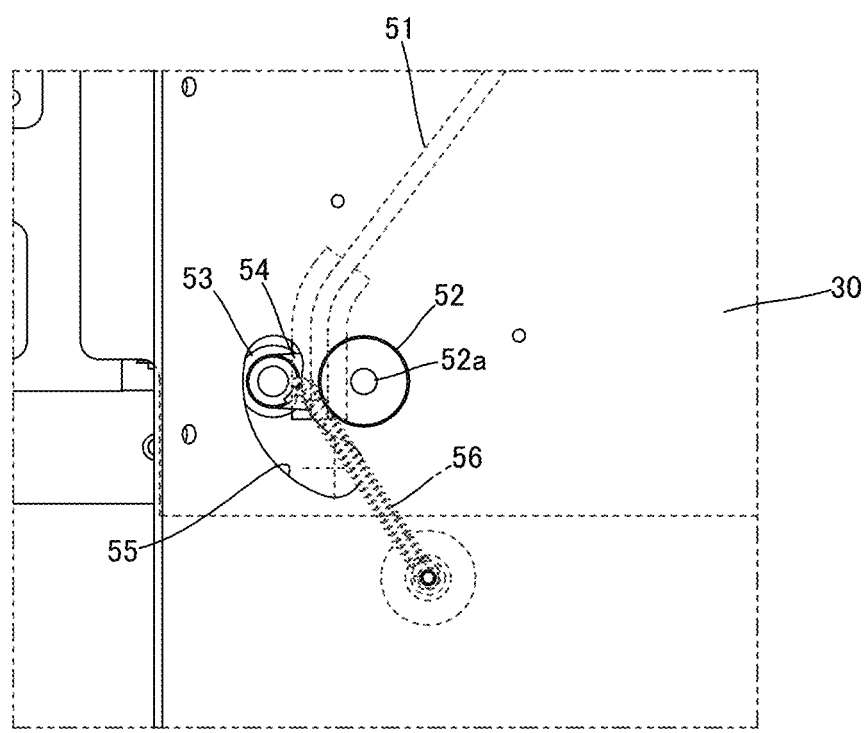
FIG. 15 is an enlarged plan view showing a critical portion of an interlocking mechanism in a seat support mechanism according to an embodiment of the present invention.

The roller 52 is turnably pivotally supported in such a way that it is protruded downward, being located eccentrically from the turning shaft 41 of the seat under the underframe 30. As shown in FIG. 15, to a turning shaft 52a of the roller 52, the basal end of an arm 54 is rockably pivoted, and at the distal end of the arm 54, the auxiliary roller 53 is pivotally supported so as to be rotatable and revolvable around the turning shaft 52a. The auxiliary roller 53 is movable along a guide groove 55, which is formed in the shape of a circular arc around the turning shaft 52a in the underframe 30, and is supported such that it can be brought close to or away from the roller 52, being always urged by a spring member 56 in a direction of being brought close to the roller 52.

The roller 52 and the auxiliary roller 53 sandwich the guide rail 51 from both sides when the directed state of the seat is changed over to the longitudinally directed state or the crosswise directed state. In such a state, the roller 52 and the auxiliary roller 53 are moved from one end to the other end of the guide rail 51 with the turning of the seat, the turning motion of the underframe 30 being converted into a linear motion, and through the turning shaft 41, transmitted to the moving pedestal 20. Thereby, it is possible to change over the state of a seat from the longitudinally directed state in FIG. 2 to the one crosswise directed state in FIG. 3, or in reverse order, from the one crosswise directed state to the longitudinally directed state.

Further, the seat support mechanism 10 includes a turning locking mechanism 60, which restrains the underframe 30 (the seat) from being turned in the respective directed states of the longitudinally directed state and the crosswise directed state. Herein, the turning locking mechanism 60 restrains the underframe 30 from being turned with respect to the leg pedestal 11, and logically it also restrains the moving pedestal 20 from being moved in an advancing/retracting direction with respect to the leg pedestal 11.

As shown in FIG. 2 to FIG. 4, the turning locking mechanism 60 includes a locking pin 61, which can be vertically protruded and retracted from the leg pedestal 11 side to the underframe 30, or vice versa, and locking holes 62a, 62b, 62c, which are provided in the underframe 30 and to/from which the locking pin 61 is engaged/disengaged.

The locking hole 62a, 62b, 62c is provided in the underframe 30 in the shape of a rectangle by three in total for one longer side along the seat back face side, and one for each of the shorter sides along both sides of the seat. The locking hole 62a, 62b, 62c is provided in a location slightly separate from the end edge of the respective relevant sides of the underframe 30 as a hole that is surrounded by the material in the area therearound for avoiding a stress concentration and increasing the strength, rather than a cutout, which is partly opened.

The locking pin 61 is incorporated in a unit 60a, which is mounted under the top face part 12 of the leg pedestal 11. In the top face part 12, a hole into which the locking pin 61 is inserted is formed, thereby the locking pin 61 being able to be protruded to above the top face part 12 of the leg pedestal 11. When the directed state of the seat has been changed over to the longitudinally directed state or the crosswise directed state, the locking pin 61 is inserted into and engaged to the locking hole 62a, 62b, 62c in the underframe 30 to which it has been aligned in a vertical direction in the relevant changed-over position of the seat.

More specifically, when the seat is in the longitudinally directed state shown in FIG. 2, the locking pin 61 is inserted into and engaged to the locking hole 62a, which is located on one longer side of the underframe 30. In addition, when the seat is in the state shown in FIG. 3, i.e., in the one crosswise directed state, the locking pin 61 is inserted into and engaged to the locking hole 62b, which is located on one shorter side of the underframe 30. Further, when the seat is in the opposite crosswise directed state shown in FIG. 4, the locking pin 61 is inserted into and engaged to the locking hole 62c, which is located on the other shorter side of the underframe 30. In the position where the locking pin 61 is retracted from above the top face part 12, no part of the moving pedestal 20, which is advanced/retracted under the top face part 12, will be interfered with the locking pin 61.

Figure 16:
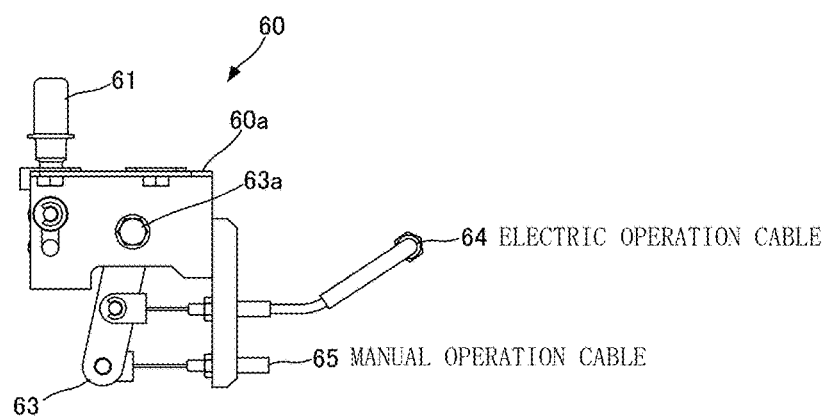
FIG. 16 is a front view showing a locking pin and a driving mechanism therefor of a turning locking mechanism in a seat support mechanism according to an embodiment of the present invention.

The locking pin 61 is protruded/retracted through an electric operation or a manual operation, being displaced between the locking position, where it is protruded upward to be inserted into the locking hole 62a, 62b, 62c, and the release position, where it is retracted downward to be disengaged from the locking hole 62a, 62b, 62c. Herein, between the electric operation and the manual operation, there is provided a difference in the stroke of the locking pin 61 from the locking position to the release position. More specifically, as shown in FIG. 16, the locking pin 61 is incorporated in the unit 60a such that it is protruded/retracted through a drive mechanism including a link 63, with which one end part thereof has a turning center 63a.

Herein, an electric operation cable 64 and a manual operation cable 65 for driving the link 63 are connected to different portions of the link 63, which provide different turning radiuses, respectively. If the respective cables 64 and 65 are operated by the same amount, the cable that is closer to the turning center 63a of the link 63 provides a greater stroke. By utilizing such difference in turning radius, the stroke of the locking pin 61 by the manual operation cable 65 is set at a half of that by the electric operation cable 64.

Further, the manual operation cable 65 is connected with a manual lever (not shown) at the distal end, being provided with a function that allows the stroke to be adjusted by the manual lever. Therefore, the electric operation cable 64 and the manual operation cable 65 can be mounted in a reversed position, and thus without the utilization of the difference in turning radius, the stroke of the locking pin 61 that is given by the operation of the manual operation cable 65 can be shortened.

Figure 17:
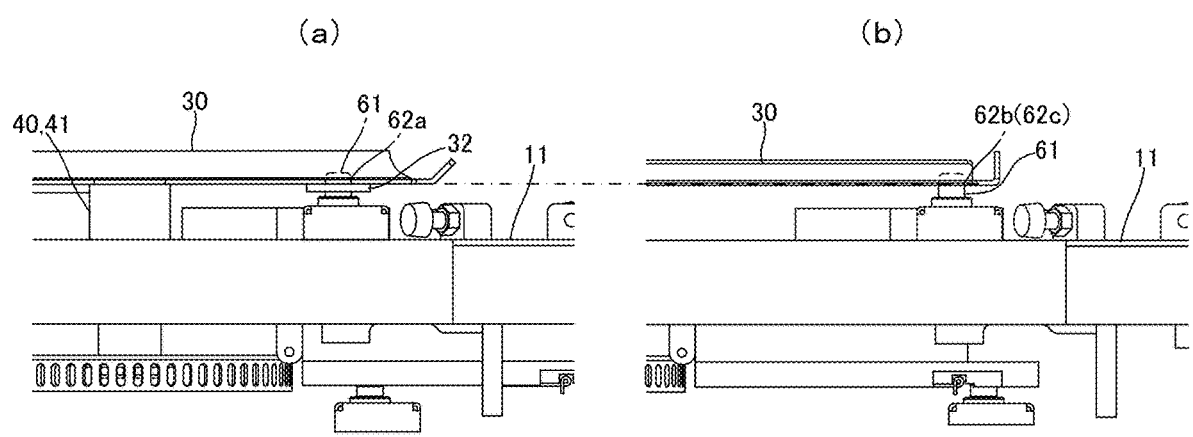
FIG. 17 is a front view showing locking holes of a turning locking mechanism in a seat support mechanism according to an embodiment of the present invention, (a) showing a locking hole provided in the vicinity of one longer side of the underframe, and (b) showing locking holes provided in the vicinity of both shorter sides of the underframe.

On the other hand, the locking holes 62a, 62b, 62c to/from which the locking pin 61 is engaged/disengaged can be discussed as follows: as shown in FIG. 2 and FIG. 17 (a), under the locking hole 62a for locking (restraining) the seat in the longitudinally directed state, a sheet metal part 32, which has a hole matching to the locking hole 62a, is mounted. Therefore, for the locking hole 62a, locking cannot be released unless the locking pin 61 is stroked more largely than for the other locking holes 62b, 62c by the amount equal to the thickness of the sheet metal part 32 (see FIG. 17 (b)).

Briefly, when the seat is in the longitudinally directed state, locking of the turning locking mechanism 60 cannot be released through an operation of the manual operation cable 65, and can be released only through an operation of the electric operation cable 64. The electric operation cable 64 is operated by a vehicle crew member or a station officer, while the manual operation cable 65 is operated by a passenger.

In order to make it possible to release the lock in an emergency, such as power failure, an emergency manual operation section, which is connected to the turning locking mechanism 60 and an advance/retraction locking mechanism 70, respectively, is provided for such a part as the leg of the leg pedestal 11. Since the amount of stroke of the locking pin 61, 71 that is given through an operation of the emergency manual operation section is larger than the thickness of the sheet metal part or the length of a hinge 75, respectively, it is possible that, in an emergency, the emergency manual operation section is operated to change over the directed state of the seat from the longitudinally directed state to the crosswise directed state, or from the crosswise directed state to the longitudinally directed state.

According to such turning locking mechanism 60, the locking pin 61 is protruded from the leg pedestal 11, which is fixed to the vehicle. Therefore, once the underframe 30 is locked so as not to be able to be turned, the moving pedestal 20, above which the underframe 30 is supported through the turning mechanism 40, is also locked at the same time so as not to be able to be advanced/retracted. Such simultaneous locking of the seat for making it unable to be turned and advanced/retracted has been implemented by mounting the locking pin 61 to the leg pedestal 11 rather than the moving pedestal 20, and in addition, providing the avoidance part 12a in the top face part 12 of the leg pedestal 11 for avoiding an interference with the turning mechanism 40.

Further, the seat support mechanism 10 includes the advance/retraction locking mechanism 70 for restraining the underframe 30 (the seat) from being advanced/retracted in the respective directed states of the longitudinally directed state and the crosswise directed state. The advance/retraction locking mechanism 70 restrains the moving pedestal 20 from being advanced/retracted with respect to the leg pedestal 11 independently of the turning locking mechanism 60. According to such advance/retraction locking mechanism 70, also in the state in which the turning locking mechanism 60 has been released, it is possible to restrain the seat from being advanced/retracted.

Figure 18:
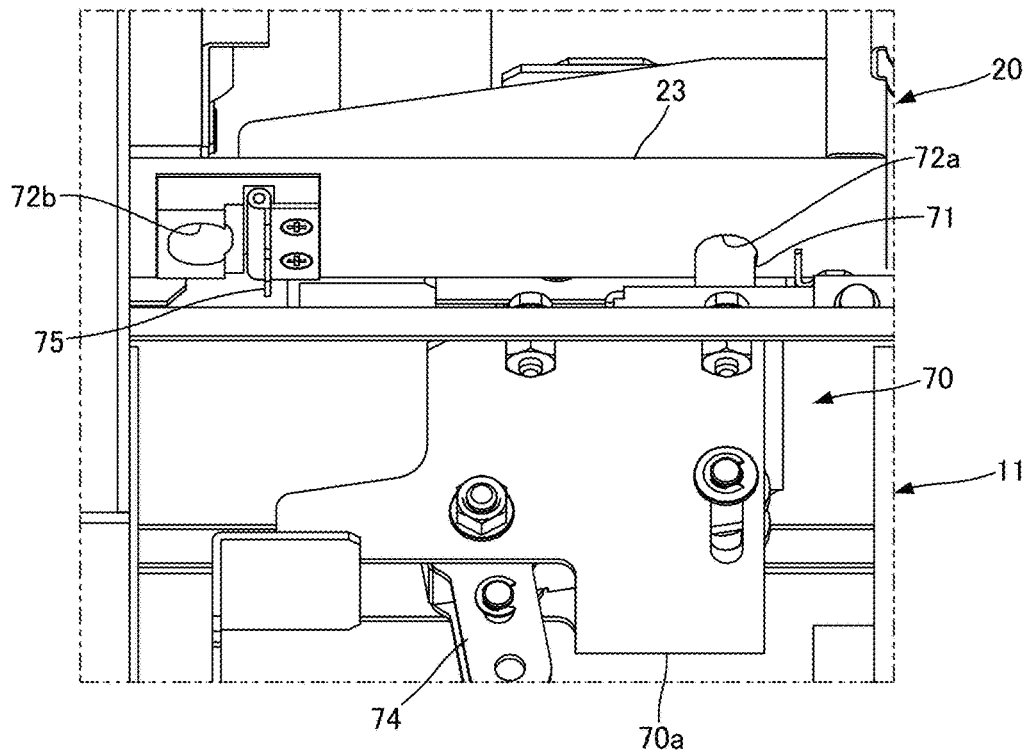
FIG. 18 is an enlarged perspective view showing a critical portion of an advance/retraction locking mechanism in a seat support mechanism according to an embodiment of the present invention.

As shown in FIG. 18, the advance/retraction locking mechanism 70 includes a locking pin 71, which can be vertically protruded and retracted from the leg pedestal 11 side to the moving pedestal 20, or vice versa, and locking holes 72a, 72b, which are provided in the moving pedestal 20 and to/from which the locking pin 71 is engaged/disengaged. As shown in FIG. 18, in the front and rear end parts of a frame member 23 that extends in the front-back direction under the rear part of the moving pedestal 20, the locking hole 72a, 72b, is provided by two in total, one for each end part. The locking holes 72a, 72b are provided in the front and rear end parts of a frame member 23, respectively, as a hole that is surrounded by the material in the area therearound for avoiding a stress concentration and increasing the strength, rather than a cutout, which is partly opened.

The locking pin 71 is incorporated in a unit 70a, which is disposed in the inner part of the leg pedestal 11, which is located under the moving pedestal 20. When the directed state of the seat has been changed over to the longitudinally directed state or the crosswise directed state, the locking pin 71 is protruded upward from just under the frame member 23 of the moving pedestal 20 to be inserted into and engaged to the locking hole 72a, 72b to which it has been aligned in a vertical direction in the relevant changed-over position of the seat. The locking pin 71 is mounted on the leg pedestal 11 side as with the locking pin 61, however, the mounting locations for both are different from each other.

Figure 8:
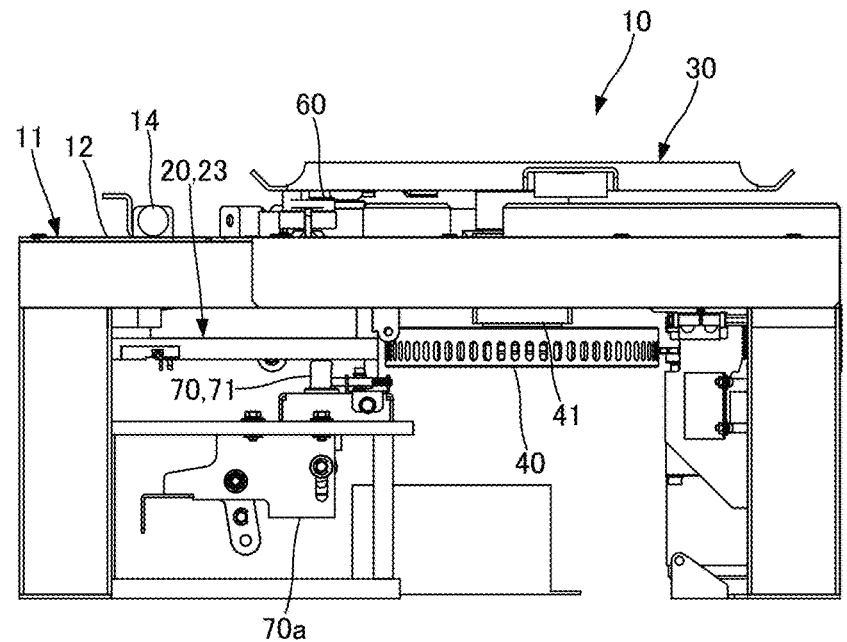
FIG. 8 is a front view showing a seat support mechanism according to an embodiment of the present invention, the directed state of the seat (not shown) that has been provided by the seat support mechanism being a longitudinally directed state.
Figure 11:
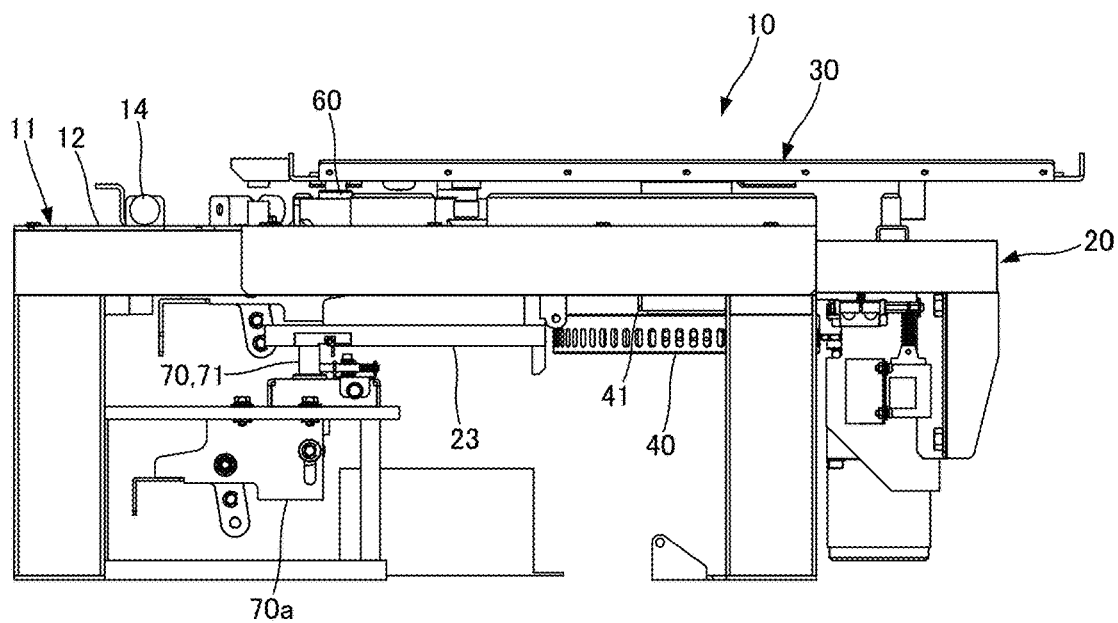
FIG. 11 is a front view showing a seat support mechanism according to an embodiment of the present invention, the directed state of the seat (not shown) that has been provided by the seat support mechanism being one crosswise directed state.
Figure 14:
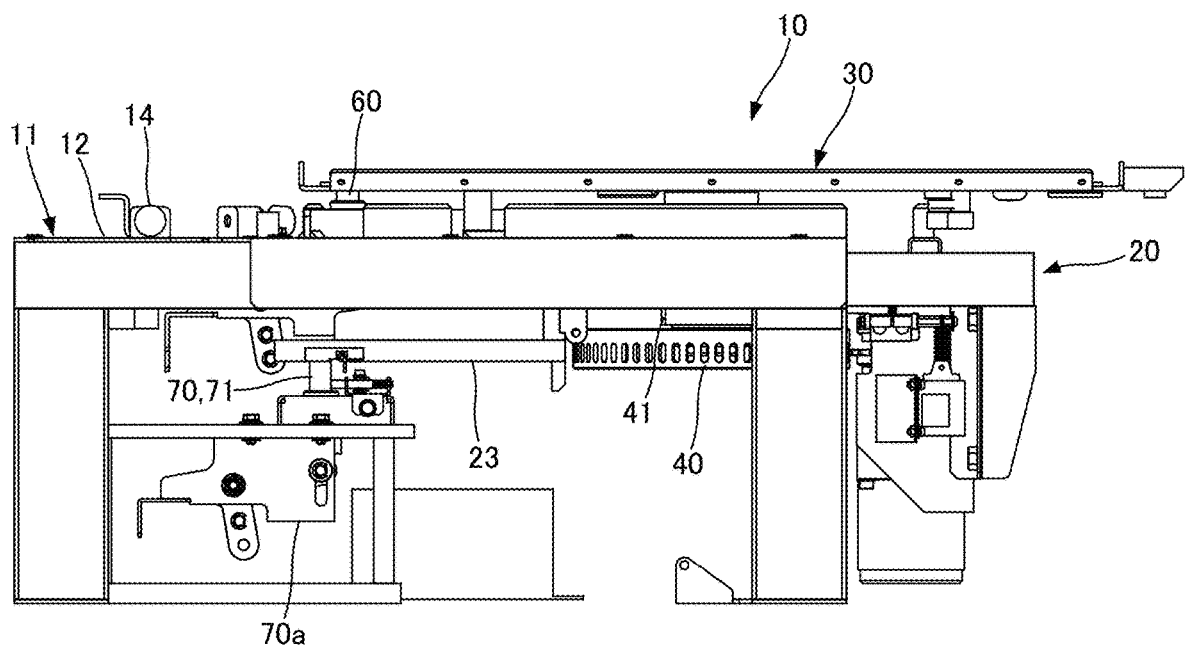
FIG. 14 is a front view showing a seat support mechanism according to an embodiment of the present invention, the directed state of the seat (not shown) that has been provided by the seat support mechanism being an opposite crosswise directed state.

More specifically, when the seat is in the longitudinally directed state as shown in FIG. 8, the locking pin 71 is inserted into and engaged to the locking hole 72a on the front side (see FIG. 18). However, when the seat is in the longitudinally directed state, it is not always necessary that the locking pin 71 be inserted into the locking hole 72a. Further, when the seat is in the one crosswise directed state as shown in FIG. 11, the locking pin 71 is inserted into and engaged to the locking hole 72b on the back side (see FIG. 18). Likewise, also when the seat is in the opposite crosswise directed state as shown in FIG. 14, the locking pin 71 is inserted into and engaged to the locking hole 72b on the back side.

Figure 20:
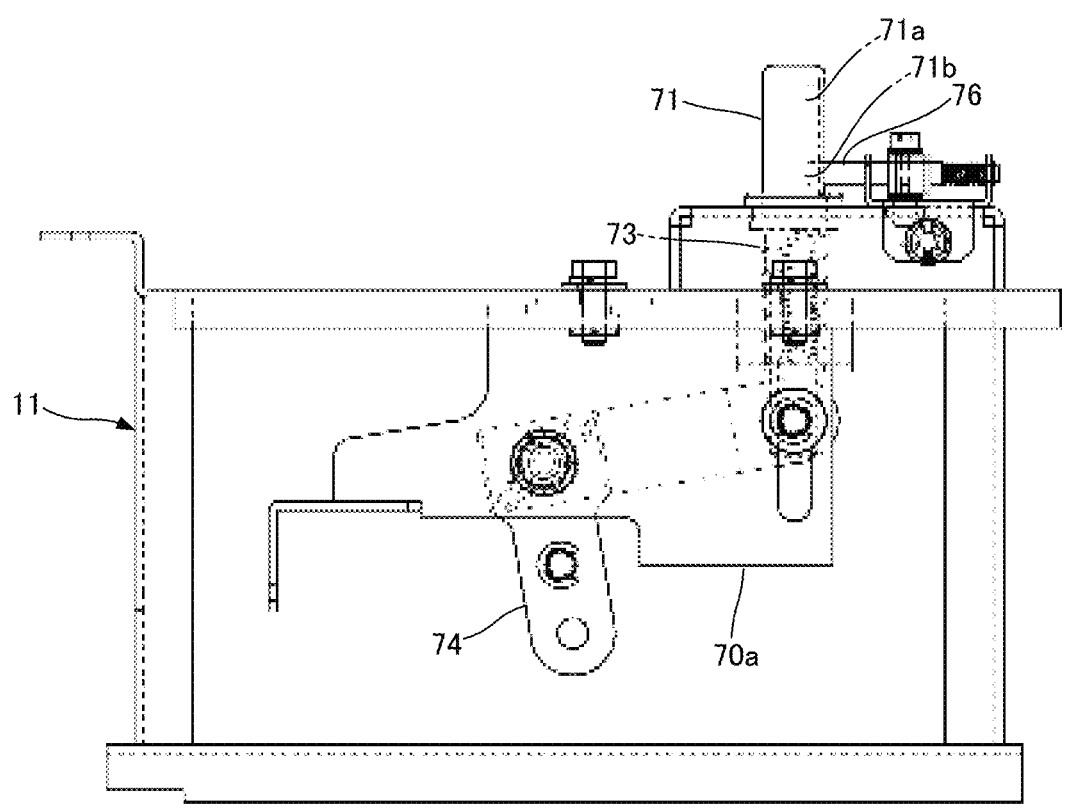
FIG. 20 is a front view showing a locking pin and a driving mechanism therefor of a turning locking mechanism in a seat support mechanism according to an embodiment of the present invention.

As shown in FIG. 20, the locking pin 71 is always urged by the spring member 73 to the locking position, where it is protruded upward. Such locking pin 71 will be displaced, only through an electric operation, to the release position, where it is retracted downward against the urging force of the spring member 73. The lower end of the locking pin 71 is connected to a solenoid (not shown) through a link 74, and by driving the solenoid, the locking pin 71 is pulled down to be displaced to the release position. Therefore, unlike the locking pin 61 of the turning locking mechanism 60, the locking pin 71 can be operated only through an electric operation, and the locking cannot be released through a manual operation.

When the seat is locked by the turning locking mechanism 60, it is also locked so as not to be able to be advanced/retracted with no need for making a specific operation, however, when the locking by the turning locking mechanism 60 is released, the advance/retraction locking mechanism 70 can be used to lock the moving pedestal 20 and the underframe 30 (the seat) so as not to be able to be advanced/retracted. In other words, when the seat cannot be turned, the seat cannot also be advanced/retracted, however, when the seat can be turned, it is possible to restrain the seat from being advanced/retracted alone, or to cause the seat to advance/retract with the turning thereof.

Figure 9:
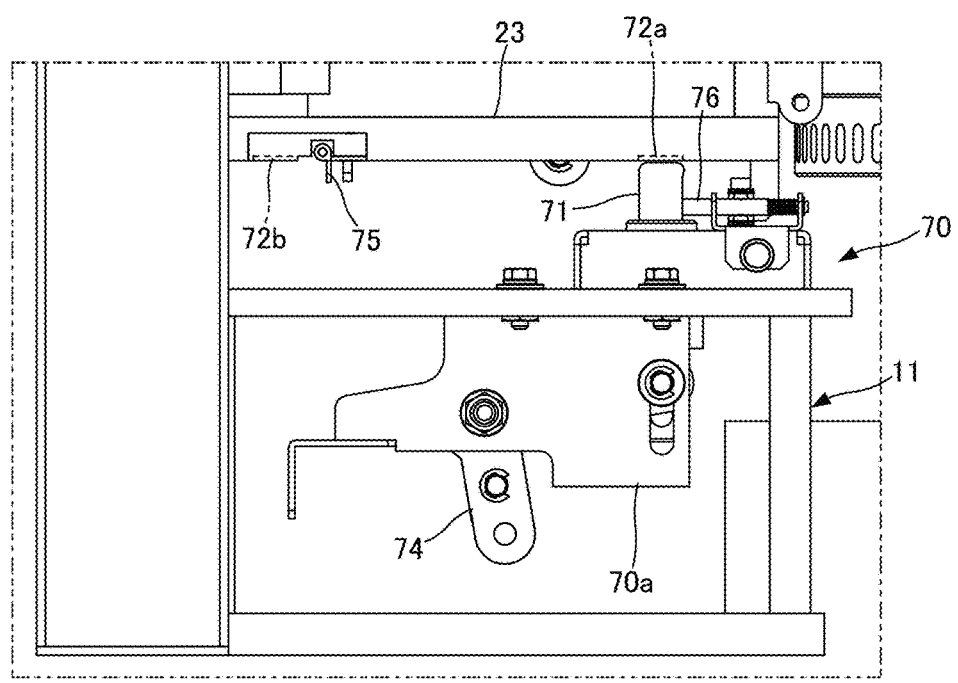
FIG. 9 is an enlarged front view showing an advance/retraction locking mechanism in a seat support mechanism according to an embodiment of the present invention, the directed state of the seat (not shown) that has been provided by the seat support mechanism being a longitudinally directed state.
Figure 12:
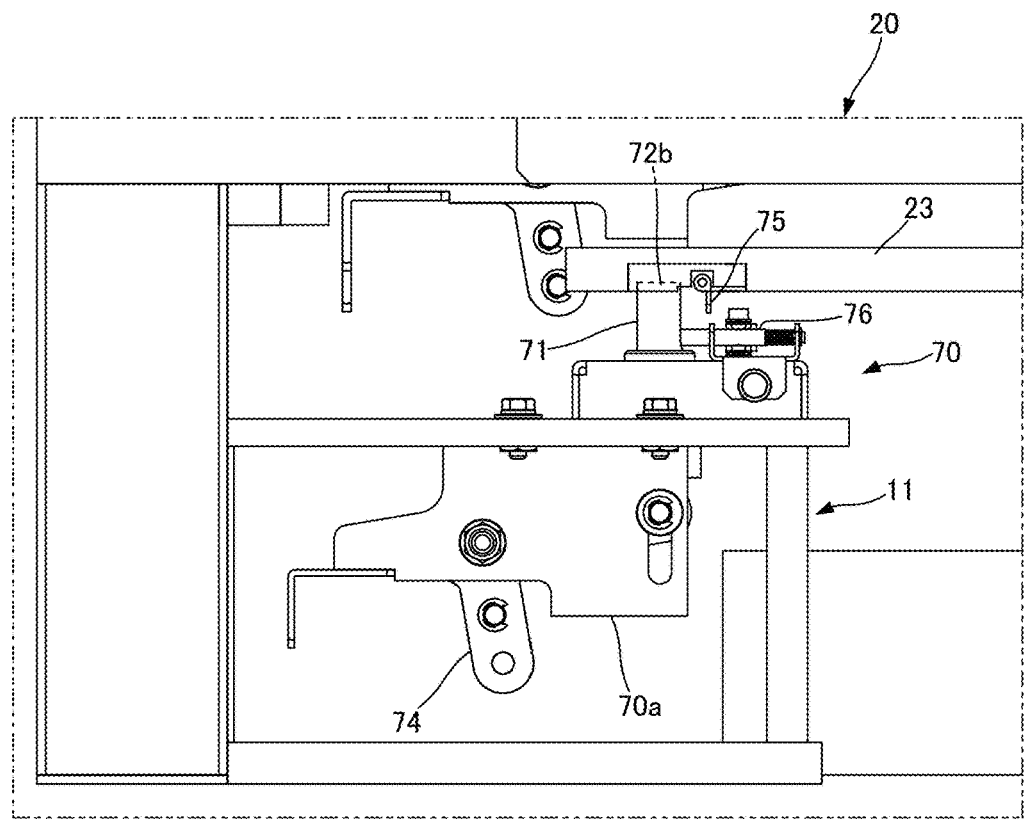
FIG. 12 is an enlarged front view showing an advance/retraction locking mechanism in a seat support mechanism according to an embodiment of the present invention, the directed state of the seat (not shown) that has been provided by the seat support mechanism being one crosswise directed state.

Further, in the advance/retraction locking mechanism 70, when the seat is turned through 90 deg. from the longitudinally directed state (the 0-deg. turned state) to the one crosswise directed state (the 90-deg. turned state), the tip of the locking pin 71 is relatively moved from the front end side of the frame member 23 shown in FIG. 9 (the right side in the figure) to the rear end side thereof (the left side in the figure), while passing under the locking hole 72b, and then is slightly returned back to the front end side to be inserted into the locking hole 72b (see FIG. 12). Herein, it is required that, when the locking pin 71 is moved to the rear end side, the locking pin 71 be prevented from being forced into the locking hole 72b by the urging force of the spring member 73.

Figure 19:
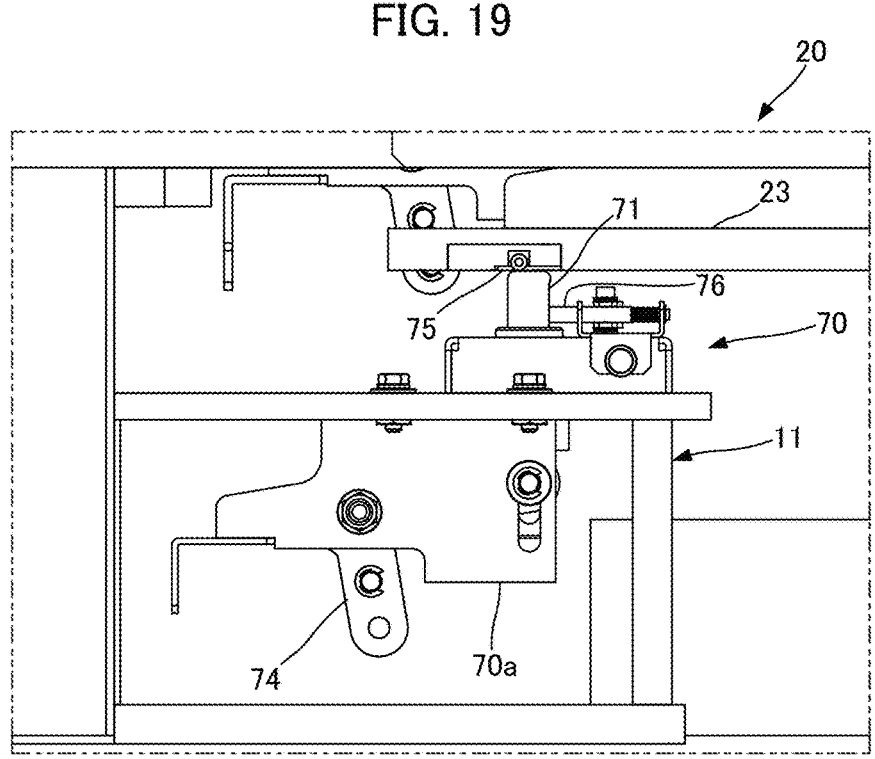
FIG. 19 is a front view for explaining an operation of an advance/retraction locking mechanism in a seat support mechanism according to an embodiment of the present invention.

Therefore, as shown in FIG. 18, ahead of the locking hole 72b, a hinge 75 for temporarily close the locking hole 72b is erectably and prostratably provided. The hinge 75 is urged to be erected ahead of the locking hole 72b. As shown in FIG. 19, the hinge 75 is provided such that, when the tip of the locking pin 71, which has been relatively moved from the front end side, is butted against the hinge 75, it is prostrated against the urging force to close the locking hole 72b. The hinge 75 will not be prostrated in an opposite direction.

Contrarily, when the tip of the locking pin 71 is relatively moved forward from the rear end side of the frame member 23 to the front end side thereof, it is required that the locking pin 71 be prevented from getting into the locking hole 72b or being caught on the hinge 75, which has been erected. Therefore, as shown in FIG. 20, beside the locking pin 71, there is provided a side pin 76, which holds the locking pin 71 in the retracted state against the urging force of the spring member 73.

Figure 21:
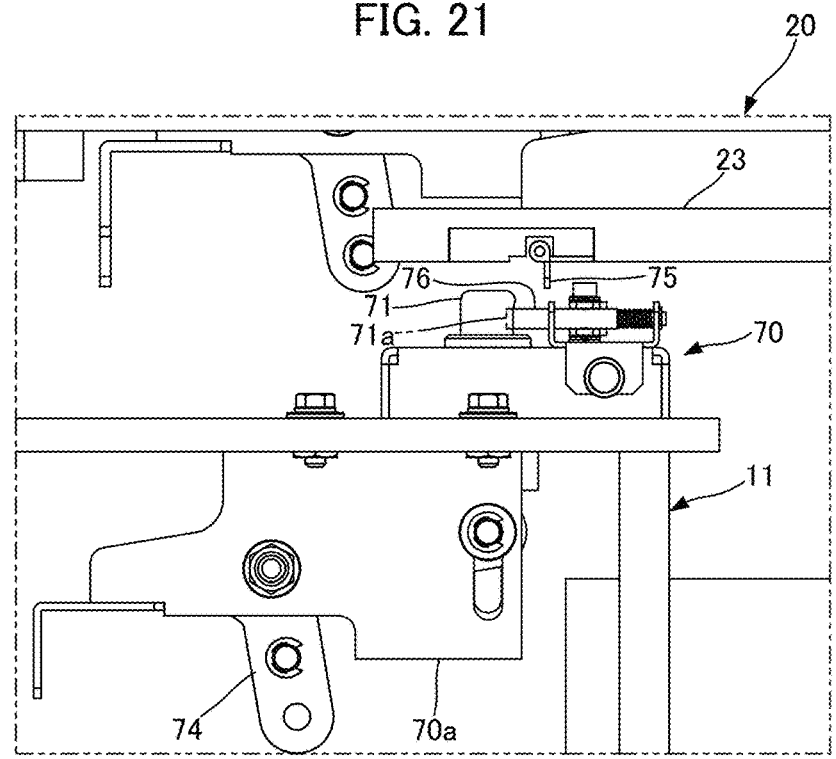
FIG. 21 is a front view for explaining an operation of an advance/retraction locking mechanism in a seat support mechanism according to an embodiment of the present invention.
Figure 22:
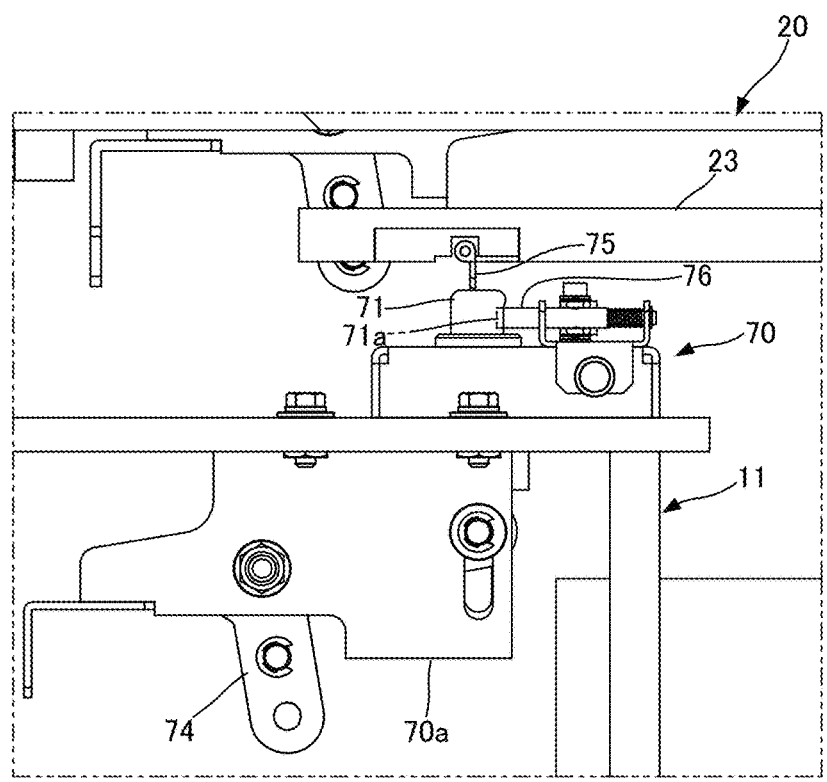
FIG. 22 is a front view for explaining an operation following the operation in FIG. 21 of an advance/retraction locking mechanism in a seat support mechanism according to an embodiment of the present invention.

The side pin 76 is supported such that it can be engaged/disengaged to/from the locking pin 71, being moved in a direction orthogonal to the axial direction of the locking pin 71. In the outer periphery of the locking pin 71, locking holes 71a, 71b are provided in locations that are vertically separated. As shown in FIG. 21, when the tip of the side pin 76 is engaged to the locking hole 71a, which is located in the upper portion of the locking pin 71, the locking pin 71 is held in the retracted release position, and, as shown in FIG. 22, it can be moved without being caught on the hinge 75. On the other hand, when the tip of the side pin 76 is engaged to the locking hole 71b, which is located in the lower portion of the locking pin 71, the locking pin 71 is held in the protruded locking position.

Figure 23:
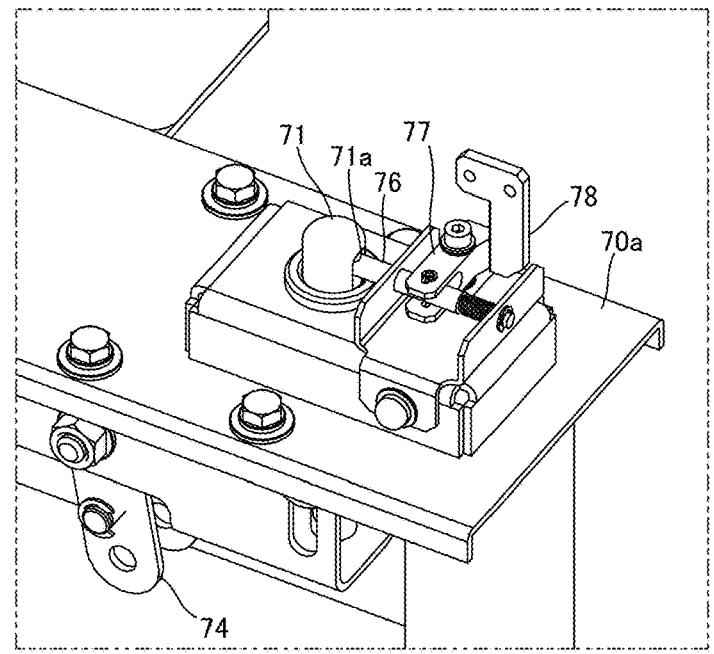
FIG. 23 is a perspective view for explaining an operation of an advance/retraction locking mechanism in a seat support mechanism according to an embodiment of the present invention.
Figure 24:
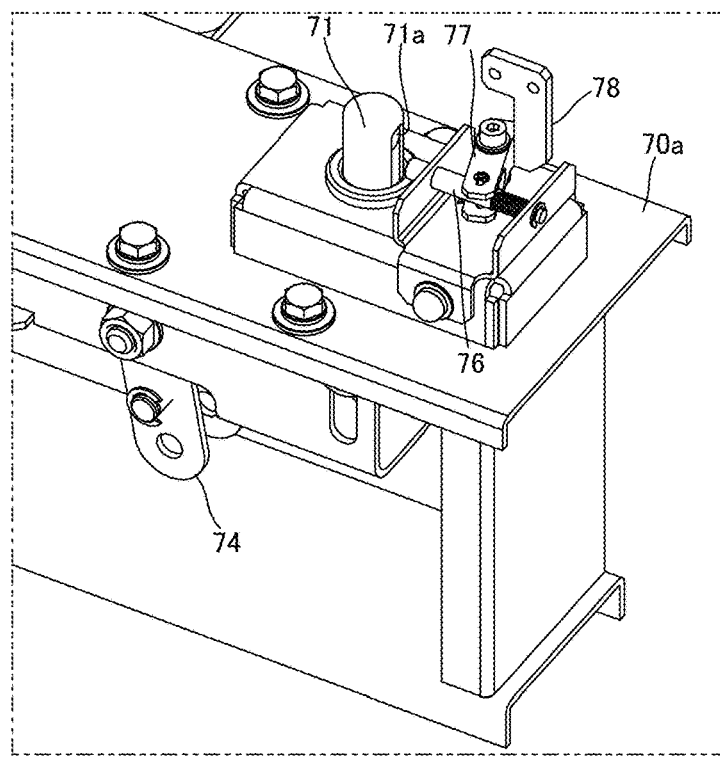
FIG. 24 is a perspective view for explaining an operation following the operation in FIG. 23 of an advance/retraction locking mechanism in a seat support mechanism according to an embodiment of the present invention.

As shown in FIG. 23 and FIG. 24, the side pin 76 is supported so as to be movable in an axial direction such that the tip thereof is engaged/disengaged to/from the locking hole 71a, 71b in the locking pin 71 through a rocking member 77. The distal end of the rocking member 77 is connected to a middle of the side pin 76 so as to be able to push or pull it, and the basal end of the rocking member 77, which is located opposite to the distal end across the rocking center, is disposed so as to be engaged/disengaged to/from a releasing lever 78, which is fixed on the moving pedestal 20 side. Therefore, when the releasing lever 78 is engaged to the basal end of the rocking member 77 to be pushed, the side pin 76 is separated from the locking pin 71 with the distal end of the rocking member 77 being rocked, thereby restraining of the locking pin 71 by the side pin 76 being released.

Next, the functions of the seat support mechanism 10 according to the present embodiment will be explained.

As shown in FIG. 1, with the seat support mechanism 10, under the top face part 12 of the leg pedestal 11, the moving pedestal 20 is disposed, while, above the top face part 12, the underframe 30, being supported by the turning shaft 41, which is provided in the moving pedestal 20, is disposed. Therefore, the seat support mechanism 10 provides a structure in which the leg pedestal 11, the moving pedestal 20, the top face part 12 of the leg pedestal 11, and the underframe 30 are laid one over another from the bottom in this order.

With such a structure, it is required that the top face part 12, which is interposed between the moving pedestal 20 and the underframe 30, do not hinder the motion of the turning shaft 41 at the time of advancing/retracting of the moving pedestal 20, and in response to such requirement, with the seat support mechanism 10, the top face part 12 is provided with an avoidance part 12a, and the turning shaft 41 is passed through such avoidance part 12a, thereby the possibility that the turning shaft 41 might interfere with the top face part 12 being eliminated. Thus, with the seat support mechanism 10 according to the present embodiment, a structure that allows advancing/retracting of the moving pedestal 20 to be made under the top face part 12 of the leg pedestal 11 has been implemented.

Figure 26:
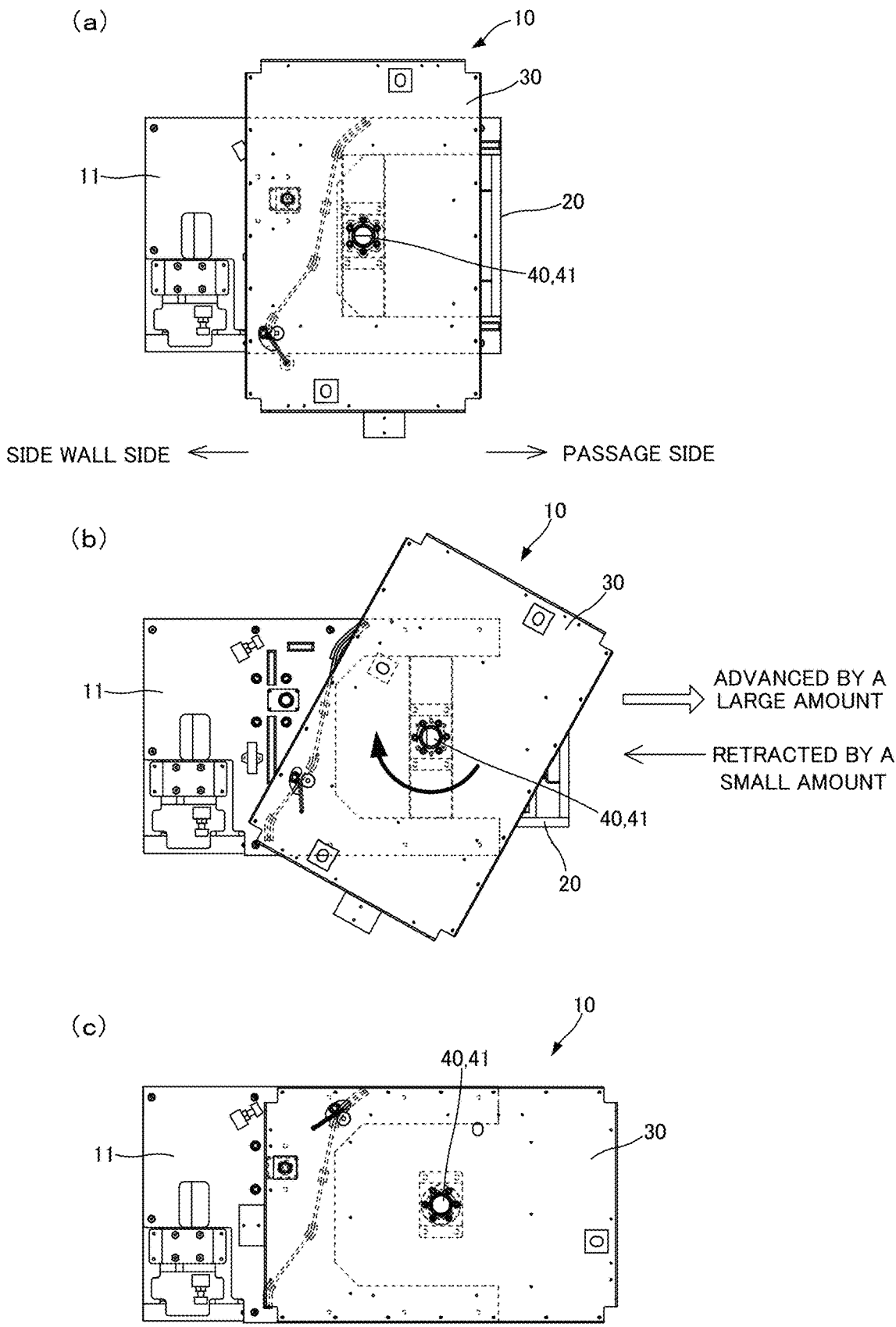
FIG. 26 is an explanatory drawing illustrating an operation for changing over the directed state of a seat (not shown) from a longitudinally directed state to one crosswise directed state with a seat support mechanism according to an embodiment of the present invention.

As shown in FIG. 26, if the seat is turned together with the underframe 30, the turning motion of the underframe 30 is converted into a linear motion, being transmitted to the moving pedestal 20 through the turning shaft 41. Therefore, the moving pedestal 20 is advanced/retracted in a direction orthogonal to the side wall A together with the underframe 30, which is being turned (see FIG. 1). With such an interlocking operation between turning and advancing/retracting of the seat, the directed state of the seat can be easily changed over between the longitudinally directed state, in which the seat back face side is in parallelism with the side wall A (FIG. 26 (a)) and the crosswise directed state, in which the seat back face side is orthogonal to the side wall A (FIG. 26 (c)), through a series of operations with no interference of the seat with the side wall A being caused, even if the seat is in the vicinity of the side wall A.

Figure 7:
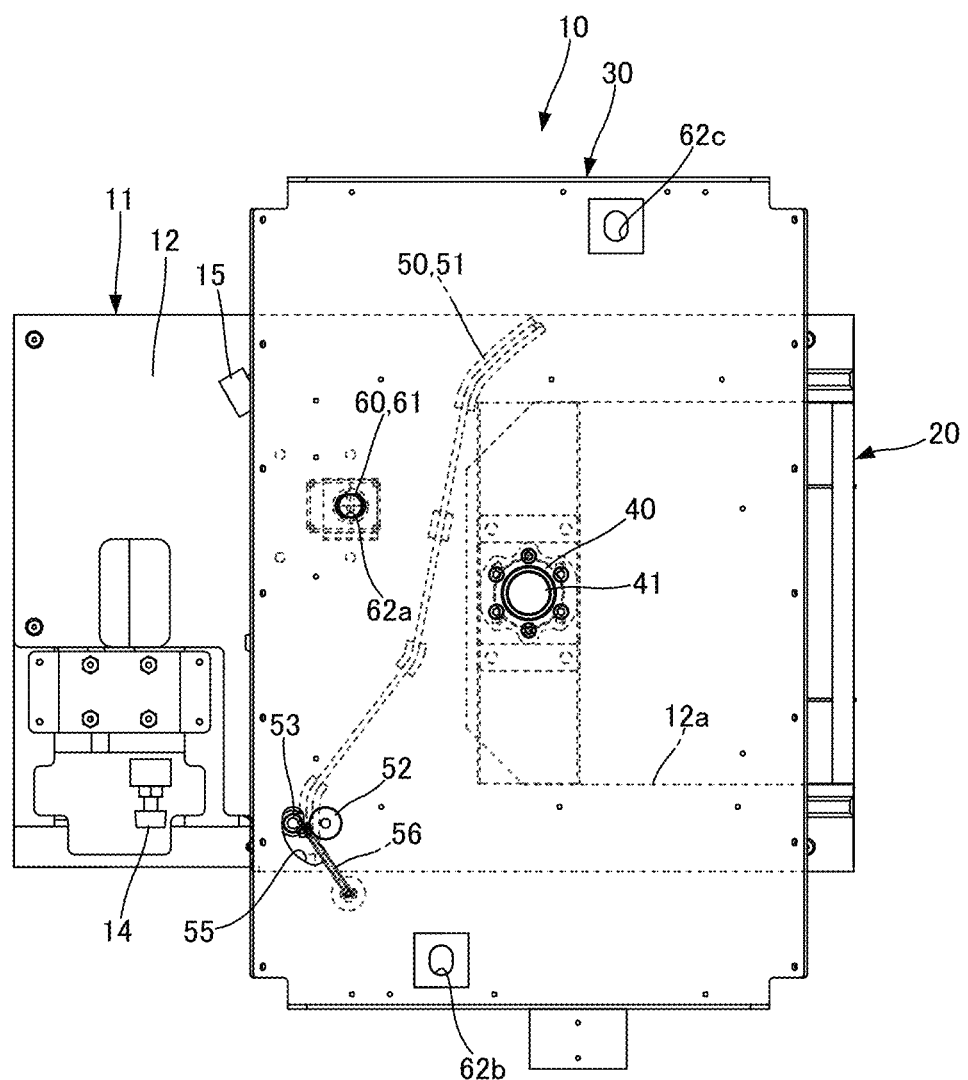
FIG. 7 is a plan view showing a seat support mechanism according to an embodiment of the present invention, the directed state of the seat (not shown) that has been provided by the seat support mechanism being a longitudinally directed state.

As shown in FIG. 2 and FIG. 7, when the underframe 30 of the seat is in the longitudinally directed state (the 0-deg. turned state), the locking pin 61 of the turning locking mechanism 60 is inserted into and engaged to the locking hole 62a on one longer side of the underframe 30. Herein, since the locking pin 61 is protruded from the leg pedestal 11, which is fixedly provided on the floor, the seat is locked so as not only to be unable to be turned, but also to be advanced/retracted, simultaneously. At this time, the advance/retraction locking mechanism 70 is not particularly required to be locked, the locking pin 71 being in a free state.

As shown in FIG. 26 (a) to FIG. 26 (c), changing over the directed state of the underframe 30 (the seat) from the longitudinally directed state (the 0-deg. turned state) to the one crosswise directed state (the 90-deg. turned state) is achieved only by making an electric operation. In order to disengage the locking pin 61 of the turning locking mechanism 60 from the locking hole 62a, it is required to stroke the locking pin 61 over a distance that is longer by an amount equal to the thickness of the sheet metal part 32, which is shown in FIG. 17 (a), and such a long distance of stroke can be provided only by making an electric operation. Therefore, when the seat is in the longitudinally directed state (the 0-deg. turned state), the locking of the turning locking mechanism 60 cannot be released by making a manual operation.

After an electric operation having been made to release the locking of the turning locking mechanism 60 in FIG. 26 (a), turning the underframe 30 (the seat) in one direction (in a clockwise direction in FIG. 26) as shown in FIG. 26 (b), the underframe 30 is turned, while the turning motion being converted into a linear motion by the interlocking mechanism 50. In other words, at the time of the underframe 30 being turned, the underframe 30 is advanced by a large amount to the passage side while being turned such that it will not interfere with the side wall A (see FIG. 1), and then is turned through 90 deg. while being retracted by a small amount as if it is drawn toward the side wall A.

Figure 10:
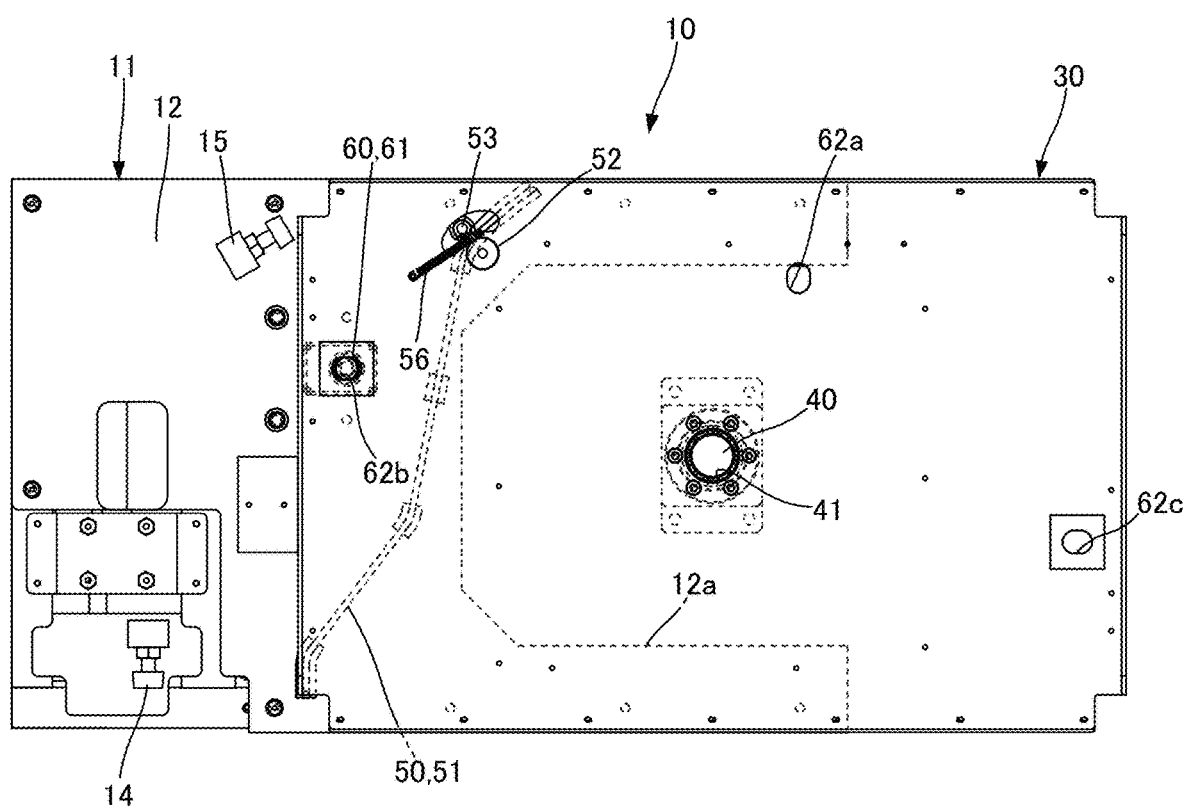
FIG. 10 is a perspective view showing a seat support mechanism according to an embodiment of the present invention, the directed state of the seat (not shown) that has been provided by the seat support mechanism being one crosswise directed state.

As shown in FIG. 7 and FIG. 10, in the interlocking mechanism 50, the roller 52 and the auxiliary roller 53 on the underframe 30 side sandwich the guide rail 51 on the leg pedestal 11 side from both sides thereof. In such a state, the roller 52 and the auxiliary roller 53 are moved from one end of the guide rail 51 to the other end thereof with the turning of the underframe 30, the turning motion of the underframe 30 being converted into a linear motion. Herein, the roller 52 is moved along one side face of the guide rail 51, while being turned, and the auxiliary roller 53 is eccentrically turned along the other side face of the guide rail 51, while being pressed, thus there being no possibility that the respective rollers 52, 53 might come off the guide rail 51.

As shown in FIG. 26 (c), when the underframe 30 (the seat) reaches the one crosswise directed state (the 90-deg. turned state), the locking pin 61 in the turning locking mechanism 60 is inserted into and engaged to the locking hole 62b on one shorter side of the underframe 30 (see FIG. 10), the underframe 30 being locked so as not to be able to be turned. At the same time, the locking pin 71 in the advance/retraction locking mechanism 70 is moved to a position where it can be inserted into the locking hole 72b on the rear side of the moving pedestal 20 (see FIG. 12).

Herein, the tip of the locking pin 71 is once passed under the locking hole 72b from the front end side of the frame member 23 shown in FIG. 9 at the time of the moving pedestal 20 being advanced/retracted with the turning of the underframe 30. At this time, when the tip of the locking pin 71 is butted against the hinge 75, which is located ahead of the locking hole 72b, from the front side, the hinge 75 as shown in FIG. 19 is prostrated, the locking hole 72b being temporarily blocked. Thereafter, the tip of the locking pin 71 is slightly returned back to the front end side of the frame member 23, being moved to a position where it can be inserted into the locking hole 72b.

Next, in order to change over the directed state of the underframe 30 (the seat) from the one crosswise directed state (the 90-deg. turned state) shown in FIG. 3 to the opposite crosswise directed state (the 270-deg turned state) shown in FIG. 4, either a manual operation or an electric operation is made. In order to disengage the locking pin 61 of the turning locking mechanism 60 from the locking hole 62b, it is required only to stroke the locking pin 61 over a distance that is shorter by an amount equal to the thickness of the sheet metal part 32, which is shown in FIG. 17 (a). Therefore, not only by making an electric operation, but also a manual operation, the locking of the turning locking mechanism 60 can be released.

In the one crosswise directed state (the 90-deg. turned state) shown in FIG. 10, after the locking of the turning locking mechanism 60 having been disengaged, the seat (not shown) is turned through an angle of 180 deg. in one direction (in a clockwise direction in FIG. 10) while the seat back face side of the seat being directed toward the passage. At this time, the advance/retraction locking mechanism 70 is locked, and thus the underframe 30 will not be advanced/retracted in a crosswise direction. Further, in the interlocking mechanism 50, the roller 52 and the auxiliary roller 53 on the underframe 30 side are removed to the outside of the other end of the guide rail 51 on the leg pedestal 11 side.

Figure 25:
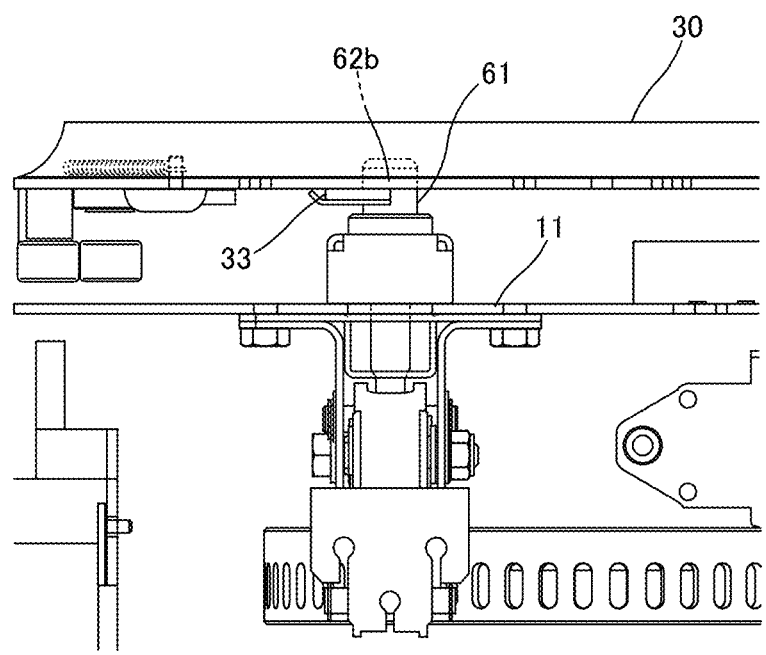
FIG. 25 is a front view showing a locking hole provided in the vicinity of one shorter side of an underframe of a turning locking mechanism in a seat support mechanism according to an embodiment of the present invention.

By the way, when the seat is in the one crosswise directed state (the 90-deg. turned state), if a manual operation is made to turn the seat in a reverse direction (a counterclockwise direction in FIG. 10) for returning it to the longitudinally directed state (the 90-deg. turned state), there is the possibility that the seat may interfere with the side wall A (see FIG. 1). Then, in the one crosswise directed state (the 90-deg. turned state), it is required to restrain the seat from being turned in the other direction. Therefore, as shown in FIG. 25, a sheet metal part 33 having a prescribed thickness (equivalent to the sheet metal part 32) is mounted along one-side half of the peripheral edge of the locking hole 62b that would accommodate the turn of the seat in the other direction. Thereby, it is made impossible to return the directed state of the seat from the one crosswise directed state (the 90-deg. turned state) to the longitudinally directed state (the 0-deg. turned state) by making a manual changing-over operation.

Figure 13:
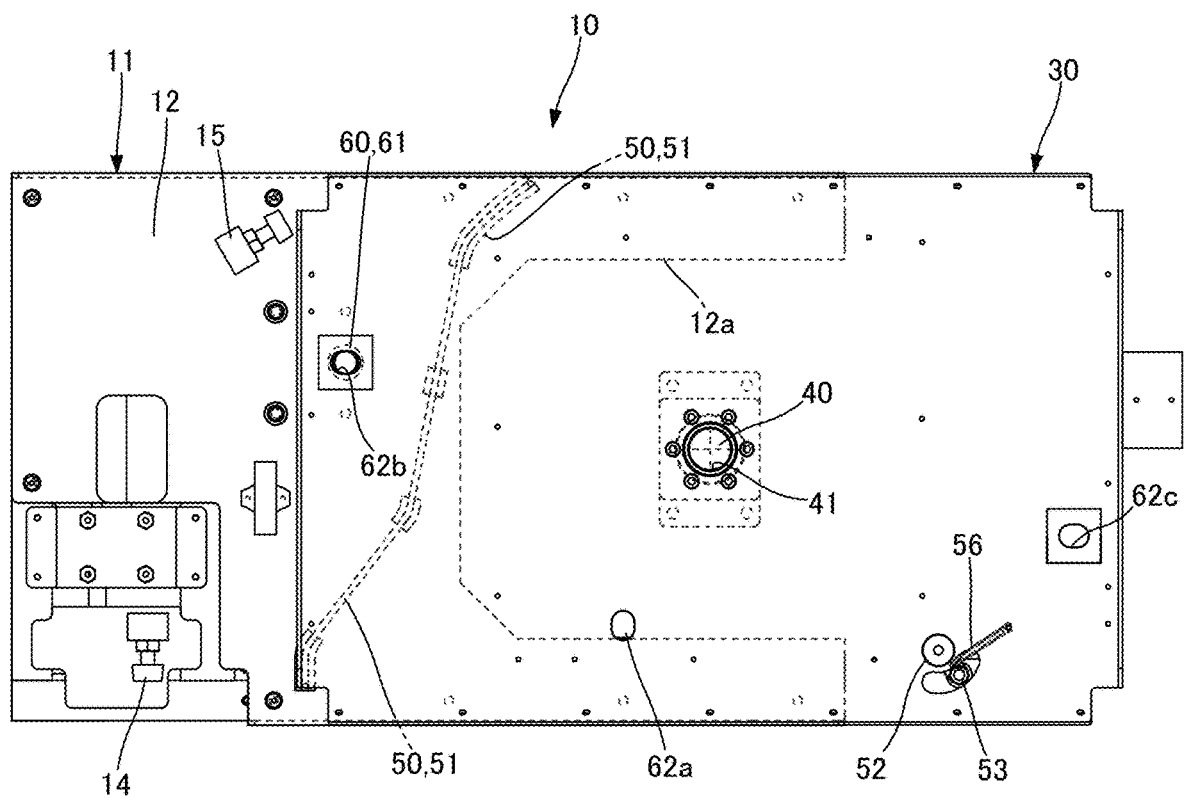
FIG. 13 is a plan view showing a seat support mechanism according to an embodiment of the present invention, the directed state of the seat (not shown) that has been provided by the seat support mechanism being an opposite crosswise directed state.

Once the seat has been turned through 180 deg. in one direction to reach the opposite crosswise directed state (the 270-deg. turned state) as shown in FIG. 13, the locking pin 61 in the turning locking mechanism 60 is inserted into and engaged to the locking hole 62c on the other shorter side of the underframe 30, thereby the underframe 30 being locked so as not to be able to be turned. At this time, the advance/retraction locking mechanism 70 remains in a locked state.

Further, in the case where the seat that has been already in the opposite crosswise directed state (the 270-deg. turned state) is moved by a manual operation, the same operation as is made in the case of an electric operation is made, however, the seat will not be further turned in the same one direction from the opposite crosswise directed state (the 270-deg. turned state), being stopped by a stopper 14, which is located in the leg pedestal 11.

Next, also in the case where the underframe 30 (the seat) is to be returned to the one crosswise directed state (the 90-deg. turned state) from the opposite crosswise directed state (the 270-deg. turned state), the operation is made through a manual operation or an electric operation. Specifically, after the locking by the turning locking mechanism 60 having been released, the underframe 30 is turned in a reverse direction (a counterclockwise direction in FIG. 13) through 180 deg. in FIG. 13. At this time, the advance/retraction locking mechanism 70 is locked, and thus the underframe 30 will not be advanced/retracted in a crosswise direction.

Once the seat has been turned through 180 deg. in a reverse direction to reach the one crosswise directed state (the 90-deg. turned state) as shown in FIG. 10, the locking pin 61 in the turning locking mechanism 60 is inserted into and engaged to the locking hole 62c on one shorter side of the underframe 30, thereby the underframe 30 being locked so as not to be able to be turned. At this time, the advance/retraction locking mechanism 70 remains in a locked state.

Further, in the interlocking mechanism 50, the roller 52 and the auxiliary roller 53 on the underframe 30 side are again engaged with the guide rail 51 on the leg pedestal 11 side from the other end thereof. At this time, since the auxiliary roller 53 has been moved by the urging force of the spring member 56 to the spring member 56 side within the range of the guide groove 55 (see FIG. 15), it can reliably receive the other end of the guide rail 51. For the seat that has already been brought to the one crosswise directed state (the 90-deg. turned state) through a manual operation, it is recommended to control the system such that turning of the seat through an electric operation will not be caused by, for example, turning a proximity switch "on". Herein the proximity switch is set so as to be turned "on" only when the seat is in the one crosswise directed state (the 90-deg. turned state).

As shown in FIG. 26 (c) to FIG. 26 (a), the operation for returning the directed state of the underframe 30 (the seat) from the one crosswise directed state (the 90-deg. turned state) to the longitudinally directed state (the 0-deg. turned state), which is the original state, is achieved only by making an electric operation. As described above, with a small stroke that is provided for the locking pin 61 in the turning locking mechanism 60 in a manual operation, the thickness of the sheet metal part 33, which is disposed in the one-side half of the locking hole 62b (see FIG. 25), cannot be overcome.

After an electric operation having been made to release the locking of the turning locking mechanism 60 in FIG. 26 (c), turning the underframe 30 (the seat) in the other direction (in a counterclockwise direction in FIG. 26), the underframe 30 is turned, while the turning motion being converted into a linear motion by the interlocking mechanism 50. In other words, at the time of the underframe 30 being turned, the underframe 30 is advanced by a small amount to the passage side while being turned such that it will not interfere with the side wall A (see FIG. 1), and then is turned through 90 deg. while being retracted by a large amount as if it is drawn toward the side wall A.

At this time, in the interlocking mechanism 50, the roller 52 and the auxiliary roller 53 on the underframe 30 side are moved from the other end of the guide rail 51 on the leg pedestal 11 side to one end thereof with the turning of the underframe 30 being converted into a linear motion. In addition, in the advance/retraction locking mechanism 70, the locking by the locking pin 71 has been released. More specifically, as shown in FIG. 22, with the tip of the side pin 76 being engaged to the locking hole 71a, which is located in the upper portion of the locking pin 71, the locking pin 71 is held in the retracted release position.

Once the underframe 30 (the seat) has been turned to reach the longitudinally directed state (the 0-deg. turned state) as shown in FIG. 26 (a), the locking pin 61 in the turning locking mechanism 60 is inserted into and engaged to the locking hole 62a on one longer side of the underframe 30 (see FIG. 7), thereby the underframe 30 being locked so as not to be able to be turned. In addition, in the advance/retraction locking mechanism 70, the side pin 76 is disengaged from the locking pin 71 to be brought into a free state.

More specifically, when, in FIG. 9, the locking pin 71 is moved to ahead of the locking hole 72a, which is located on the front side of the frame member 23, the rocking member 77 is pressed to be rocked by the releasing lever 78 on the moving pedestal 20 side as shown in FIG. 24, thereby the side pin 76 being separated from the locking hole 71a in the locking pin 71. As shown in FIG. 7, when the underframe 30 (the seat) is in the longitudinally directed state (the 0-deg. turned state), the underframe 30 will not be turned in a reverse direction (in a counterclockwise direction in the figure) from the longitudinally directed state (the 0-deg. turned state), being stopped by a stopper 14, which is located in the leg pedestal 11.

In this way, according to the present seat support mechanism 10, the underframe 30 is disposed above the top face part 12 of the leg pedestal 11, which provides the base fixed side, and is turned without the moving pedestal 20 being interposed between it and the top face part 12. Therefore, the underframe 30 can be easily locked from the leg pedestal 11 to be restrained from being moved. In the case where the underframe 30 is locked from the leg pedestal 11 side to be restrained from being moved, the underframe 30 is made unable not only to be turned, but also to be advanced/retracted with respect to the leg pedestal 11.

Therefore, it is possible to implement the turning locking mechanism 60 that can restrain the underframe 30 from being turned and advanced/retracted simultaneously. With such turning locking mechanism 60, not only restraining the underframe 30 from being turned with respect to the moving pedestal 20, but also restraining the moving pedestal 20 with respect to the leg pedestal 11 can be performed by means of a single locking mechanism.

In addition, by providing the advance/retraction locking mechanism 70, which can restrain the underframe 30 from being advanced/retracted, besides the turning locking mechanism 60, it has been made possible to restrain advancing/retracting of the seat even in the state in which the restraint by the turning locking mechanism 60 has been released, whereby the seat can be turned with the advanced/retracted position of the seat remaining fixed.

Heretofore, the embodiment of the present invention has been described with reference to the drawings, however, the specific configuration is not limited to that of the above-described embodiment, and various changes and modifications may be included in the present invention, so long as they do not depart from the spirit and scope thereof. For example, the specific geometries of the leg pedestal 11, the moving pedestal 20, and the underframe 30 are not limited to those as shown in the figures. Further, the above-described embodiment has been explained using a seat for two-occupants as an example, however, the seat may be a three-occupant one or a single-occupant one.

In addition, the avoidance part 12a, which is provided in the top face part 12 of the leg pedestal 11, is formed as a cutout that is recessed toward the inside from the shorter side on the front side of the top face part 12, being extended substantially to the center of the top face part 12, however, the avoidance part 12a will answer the purpose so long as the top face part 12 is not interfered with the turning shaft 41 only in a place along the movement locus of the turning shaft 41. Therefore, the avoidance part may be otherwise formed, for example, as a long narrow hole or groove that is provided in the top face part 12 so as to include the movement locus of the turning shaft 41.

Furthermore, the interlocking mechanism 50 is not limited to that which is equipped with the guide rail 51. In other words, the interlocking mechanism may be constituted by a cam that is provided under the underframe 30, and a cam follower in the shape of a roller that is provided in the top face part 12 of the leg pedestal 11. With such a cam-type interlocking mechanism, by turning the cam while pressing it against the cam follower, the turning force can be converted into a linear motion of the moving pedestal 20 to thereby change over the directed state of the seat from the longitudinally directed state to the one crosswise directed state, or from the one crosswise directed state to the longitudinally directed state.

The present invention can be widely used as a seat support mechanism that is applicable to vehicle seats that are installed in cabins of railroad vehicles, airplanes, automobiles, marine vessels, and others, and in addition to these, to seats for use in theaters, homes, offices, etc.

Reference numeral 10 a seat support mechanism; 11 a leg pedestal; 12 a top face part; 12a an avoidance part; 13a a guide rail; a stopper; 20 a moving pedestal; 21 a side part; 22 a bearing part; 23 a frame member; 30 an underframe; 40 a turning mechanism; 50 an interlocking mechanism; 51 a guide rail; 52 a roller; 53 an auxiliary roller; 60 a turning locking mechanism; 61 a locking pin; 62a, 62b, 62c a locking hole; 70 an advance/retraction locking mechanism; 71 a locking pin; and 72a, 72b a locking hole.

What is claimed is:

1. A seat support mechanism for turning a seat of a vehicle, comprising:
   a leg pedestal attached to a floor of the vehicle near a wall face of the vehicle, said leg pedestal including two side parts extending in a direction orthogonal to the wall face, said leg pedestal further including a top face part covering the two side parts;
   a moving pedestal supported on the two side parts to be movable under the top face part of the leg pedestal in the direction orthogonal to the wall face;
   an underframe to be attached to the seat and disposed above the top face part, said underframe being turnably supported by a turning shaft;
   a turning locking mechanism disposed on the leg pedestal and the underframe to lock the underframe; and
   an interlocking mechanism disposed on the moving pedestal and the underframe to move the moving pedestal through the turning shaft in the direction orthogonal to the wall face when the underframe is turned,
   wherein said leg pedestal includes an avoidance part formed in the top face part so that the turning shaft moves through the avoidance part, and
   said turning locking mechanism comprises:
   a first locking hole formed in the underframe, and
   a first locking pin disposed on the top face part of the leg pedestal to be protruded upward or retracted downward so that the first locking pin engages with or disengages from the first locking hole.

2. The seat support mechanism according to claim 1, wherein said interlocking mechanism comprises:
   a guide rail attached to the top face part of the leg pedestal, and
   a roller attached to the underframe and pressed against the guide rail.

3. The seat support mechanism according to claim 2, wherein said interlocking mechanism further comprises an auxiliary roller disposed to face the roller and urged toward the roller so that the roller and the auxiliary roller sandwich the guide rail.

4. The seat support mechanism according to claim 1, further comprising a locking mechanism disposed on the leg pedestal and the moving pedestal to lock the moving pedestal.

5. The seat support mechanism according to claim 4, wherein said locking mechanism comprises:
   a second locking hole formed in the moving pedestal, and
   a second locking pin disposed on the leg pedestal to be protruded upward or retracted downward so that the second locking pin engages with or disengages from the second locking hole.

* * * * *